(12) United States Patent
Pei et al.

(10) Patent No.: US 11,743,551 B2
(45) Date of Patent: Aug. 29, 2023

(54) VIDEO CAPTION GENERATING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Wenjie Pei, Shenzhen (CN); Jiyuan Zhang, Shenzhen (CN); Lei Ke, Shenzhen (CN); Yuwing Tai, Shenzhen (CN); Xiaoyong Shen, Shenzhen (CN); Jiaya Jia, Shenzhen (CN); Xiangrong Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 17/328,970

(22) Filed: May 24, 2021

(65) Prior Publication Data
US 2021/0281774 A1 Sep. 9, 2021

Related U.S. Application Data

(63) Continuation of application No. PCT/CN2020/081721, filed on Mar. 27, 2020.

(30) Foreign Application Priority Data

Apr. 22, 2019 (CN) .......................... 201910325193.0

(51) Int. Cl.
*G06K 9/36* (2006.01)
*G06K 9/46* (2006.01)
(Continued)

(52) U.S. Cl.
CPC ......... *H04N 21/4884* (2013.01); *G06F 18/22* (2023.01); *G06F 18/253* (2023.01);
(Continued)

(58) Field of Classification Search
None
See application file for complete search history.

(56) References Cited

U.S. PATENT DOCUMENTS 10,303,768 B2 * 5/2019 Divakaran ............. G06V 20/46
10,402,658 B2 * 9/2019 Min ....................... G06V 20/52
(Continued)

FOREIGN PATENT DOCUMENTS

| CN | 108024158 A | 5/2018 |
|---|---|---|
| CN | 108388900 A | 8/2018 |

(Continued)

OTHER PUBLICATIONS

Gao et al., "Hierarchical LSTMs with Adaptive Attention for Visual Captioning," in IEEE Transactions on Pattern Analysis and Machine Intelligence, vol. 42, No. 5, pp. 1112-1131, May 1, 2020, doi: 10.1109/TPAMI.2019.2894139. (Date of Publication: Jan. 20, 2019) (Year: 2019).*

(Continued)

*Primary Examiner* — Feng Niu
(74) *Attorney, Agent, or Firm* — Anova Law Group, PLLC

(57) ABSTRACT

A video caption generating method is provided to a computer device. The method includes encoding a target video by using an encoder of a video caption generating model, to obtain a target visual feature of the target video, decoding the target visual feature by using a basic decoder of the video caption generating model, to obtain a first selection probability corresponding to a candidate word, decoding the target visual feature by using an auxiliary decoder of the (Continued)

video caption generating model, to obtain a second selection probability corresponding to the candidate word, a memory structure of the auxiliary decoder including reference visual context information corresponding to the candidate word, determining a decoded word in the candidate word according to the first selection probability and the second selection probability, and generating a video caption according to decoded word.

20 Claims, 13 Drawing Sheets

(51) Int. Cl.
    *H04N 21/488*     (2011.01)
    *H04N 5/278*     (2006.01)
    *G06V 20/40*     (2022.01)
    *G06F 18/22*     (2023.01)
    *G06F 18/28*     (2023.01)
    *G06F 18/25*     (2023.01)
    *G06V 10/75*     (2022.01)
    *G06V 10/772*     (2022.01)
    *G06V 20/62*     (2022.01)
    *H04N 21/234*     (2011.01)
    *H04N 21/235*     (2011.01)
    *H04N 21/435*     (2011.01)
    *H04N 21/8549*     (2011.01)

(52) U.S. Cl.
    CPC .............. *G06F 18/28* (2023.01); *G06V 10/75* (2022.01); *G06V 10/772* (2022.01); *G06V 20/41* (2022.01); *G06V 20/47* (2022.01); *G06V 20/635* (2022.01); *H04N 5/278* (2013.01); *H04N 21/235* (2013.01); *H04N 21/23418* (2013.01); *H04N 21/435* (2013.01); *H04N 21/488* (2013.01); *H04N 21/8549* (2013.01)

(56) References Cited

U.S. PATENT DOCUMENTS

| | | | | |
|---|---|---|---|---|
| 10,558,750 | B2* | 2/2020 | Lu | G06N 3/082 |
| 10,565,305 | B2* | 2/2020 | Lu | G06N 3/044 |
| 10,565,306 | B2* | 2/2020 | Lu | G06V 10/454 |
| 10,592,751 | B2* | 3/2020 | Chen | G06V 10/82 |
| 10,831,834 | B2* | 11/2020 | Zheng | G06F 40/258 |
| 10,909,157 | B2* | 2/2021 | Paulus | G06N 3/08 |
| 11,003,949 | B2* | 5/2021 | Lan | G06N 3/044 |
| 2017/0357720 | A1 | 12/2017 | Torabi et al. | |
| 2018/0124331 | A1* | 5/2018 | Min | G06V 20/52 |
| 2018/0143966 | A1* | 5/2018 | Lu | G06F 40/274 |
| 2018/0144208 | A1* | 5/2018 | Lu | G06N 3/045 |
| 2018/0144248 | A1* | 5/2018 | Lu | G06V 10/454 |
| 2018/0225519 | A1* | 8/2018 | Chen | G06V 10/82 |
| 2019/0362020 | A1* | 11/2019 | Paulus | G06N 3/08 |
| 2020/0065389 | A1 | 2/2020 | Lu et al. | |
| 2020/0074227 | A1* | 3/2020 | Lan | G06F 18/214 |
| 2020/0167391 | A1* | 5/2020 | Zheng | G06F 16/3347 |
| 2020/0304796 | A1 | 9/2020 | Wang et al. | |
| 2022/0014807 | A1* | 1/2022 | Lin | G06V 10/764 |
| 2022/0141503 | A1* | 5/2022 | Cui | G06V 10/82 725/19 |

FOREIGN PATENT DOCUMENTS

| | | |
|---|---|---|
| CN | 108419094 A | 8/2018 |
| CN | 108509411 A | 9/2018 |
| CN | 109344288 A | 2/2019 |
| CN | 109359214 A | 2/2019 |
| CN | 109874029 A | 6/2019 |

OTHER PUBLICATIONS

Xu et al., "Dual-Stream Recurrent Neural Network for Video Captioning," in IEEE Transactions on Circuits and Systems for Video Technology, vol. 29, No. 8, pp. 2482-2493, Aug. 2019 (Date of Publication: Aug. 26, 2018). (Year: 2018).*
Zha et al., "Context-Aware Visual Policy Network for Fine-Grained Image Captioning," in IEEE Transactions on Pattern Analysis and Machine Intelligence, vol. 44, No. 2, pp. 710-722, Feb. 1, 2022, doi: 10.1109/TPAMI.2019.2909864. (Date of Publication: Apr. 9, 2019) (Year: 2019).*
Chen et al., "SCA-CNN: Spatial and Channel-Wise Attention in Convolutional Networks for Image Captioning," 2017 IEEE Conference on Computer Vision and Pattern Recognition (CVPR), Honolulu, HI, USA, 2017, pp. 6298-6306, doi: 10.1109/CVPR.2017.667. (Year: 2017).*
Han et al., "Explainable image caption generator using attention and Bayesian inference." In 2018 International Conference on Computational Science and Computational Intelligence (CSCI), pp. 478-481. IEEE, 2018. (Year: 2018).*
Li et al., "Visual to Text: Survey of Image and Video Captioning," in IEEE Transactions on Emerging Topics in Computational Intelligence, vol. 3, No. 4, pp. 297-312, Aug. 2019 (Date of Publication: Jan. 27, 2019). (Year: 2019).*
Vinyals et al., "Show and tell: A neural image caption generator." In Proceedings of the IEEE conference on computer vision and pattern recognition, pp. 3156-3164. 2015. (Year: 2015).*
Venugopalan et al., "Sequence to Sequence—Video to Text," 2015 IEEE International Conference on Computer Vision (ICCV), Santiago, Chile, 2015, pp. 4534-4542, doi: 10.1109/ICCV.2015.515. (Year: 2015).*
The World Intellectual Property Organization (WIPO) International Search Report for PCT/CN2020/081721 dated Jun. 15, 2020 7 Pages (including translation).
The State Intellectual Property Office of the People's Republic of China (SIPO) Office Action 1 for for 201910325193.0 dated Oct. 12, 2020 8 Pages (including translation).

* cited by examiner

Related art      A woman is mixing ingredients in a bowl

This application    A woman is pouring liquid into a bowl

VIDEO CAPTION GENERATING METHOD AND APPARATUS, DEVICE, AND STORAGE MEDIUM

RELATED APPLICATION(S)

This application is a continuation application of PCT Patent Application No. PCT/CN2020/081721, filed on Mar. 27, 2020, which claims priority to Chinese Patent Application No. 2019103251930, entitled "VIDEO CAPTION GENERATING METHOD AND APPARATUS, DEVICE, AND STORAGE MEDIUM" and filed with the China National Intellectual Property Administration on Apr. 22, 2019, all of which are incorporated herein by reference in entirety.

FIELD OF THE TECHNOLOGY

Embodiments of the present disclosure relate to the field of artificial intelligence technologies and the field of video caption, and in particular, to a video caption generating method and apparatus, a device, and a storage medium.

BACKGROUND

Video captioning is a technology of generating content description information for a video. In the field of artificial intelligence, generation of a video caption for a video is often based on an encoder-decoder framework.

In generating the video caption, an encoder may be used to extract a visual feature in a video, then the extracted visual feature is imported to a decoder, where decoded words are sequentially generated by the decoder according to the visual feature, and then the generated decoded words are combined into a video caption.

Certain existing video caption generation methods often focus only on a video that is being currently processed. However, in certain implementations, the same decoded word may be used in a plurality of videos with similar but not completely the same semantics, which often results in an excessively limited focus angle of the video caption generating process, and further affects the quality of the generated video caption.

SUMMARY

According to various embodiments provided in the present disclosure, a video caption generating method and apparatus, a device, and a storage medium are provided. The technical solutions are as follows:

In one aspect, the present disclosure provides a video caption generating method, performed by a computer device. The method includes: encoding a target video by using an encoder of a video caption generating model, to obtain a target visual feature of the target video; decoding the target visual feature by using a basic decoder of the video caption generating model, to obtain a first selection probability corresponding to a candidate word; decoding the target visual feature by using an auxiliary decoder of the video caption generating model, to obtain a second selection probability corresponding to the candidate word, a memory structure of the auxiliary decoder including reference visual context information corresponding to the candidate word, and the reference visual context information being generated according to a related video corresponding to the candidate word; determining a decoded word in the candidate word according to the first selection probability and the second selection probability; and generating a video caption corresponding to the target video according to decoded word.

In another aspect, the present disclosure provides a video caption generating apparatus, disposed in a computer device. The apparatus includes: a memory storing computer program instructions; and a processor coupled to the memory and configured to execute the computer program instructions and perform: encoding a target video by using an encoder of a video caption generating model, to obtain a target visual feature of the target video; decoding the target visual feature by using a basic decoder of the video caption generating model, to obtain a first selection probability corresponding to a candidate word; decoding the target visual feature by using an auxiliary decoder of the video caption generating model, to obtain a second selection probability corresponding to the candidate word, a memory structure of the auxiliary decoder including reference visual context information corresponding to the candidate word, and the reference visual context information being generated according to a related video corresponding to the candidate word; determining a decoded word in the candidate word according to the first selection probability and the second selection probability; and generating a video caption corresponding to the target video according to the decoded word.

In yet another aspect, the present disclosure provides a non-transitory computer-readable storage media, storing at least one computer-readable instruction, at least one program, a code set, or a computer-readable instruction set, the at least one computer-readable instruction, the at least one program, the code set, or the computer-readable instruction set being loaded and executed by one or more processors to perform: encoding a target video by using an encoder of a video caption generating model, to obtain a target visual feature of the target video; decoding the target visual feature by using a basic decoder of the video caption generating model, to obtain a first selection probability corresponding to a candidate word; decoding the target visual feature by using an auxiliary decoder of the video caption generating model, to obtain a second selection probability corresponding to the candidate word, a memory structure of the auxiliary decoder including reference visual context information corresponding to the candidate word, and the reference visual context information being generated according to a related video corresponding to the candidate word; determining a decoded word in the candidate word according to the first selection probability and the second selection probability; and generating a video caption corresponding to the target video according to decoded word.

A computer program product is provided, the computer program product, when run on a computer, causing the computer to perform the video caption generating method in the foregoing aspect.

Details of one or more embodiments of the present disclosure are provided in the accompanying drawings and descriptions below. Based on the specification, the accompanying drawings, and the claims of the present disclosure, other features, objectives, and advantages of the present disclosure become clearer.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
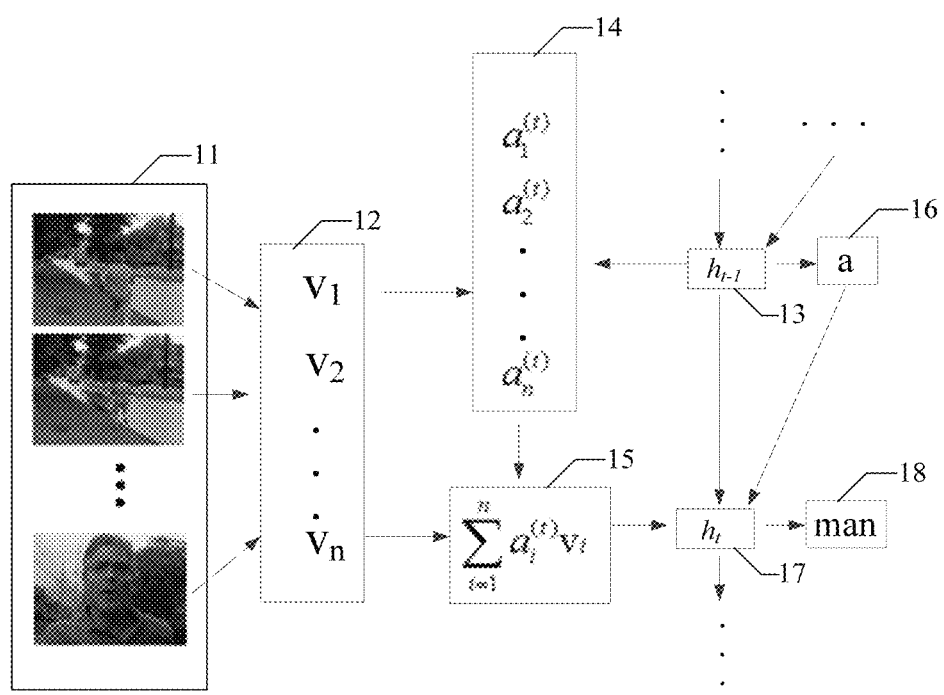
FIG. 1 is a schematic diagram of generating a video caption by using an SA-LSTM model according to one or more embodiments of the present disclosure.

In the field of video captioning, it is a conventional measure to automatically generate video captioning for a video by using a video captioning generating model constructed based on an encoder-decoder framework. The video caption generating model based on the encoder-decoder framework may be a soft attention long short-term memory (SA-LSTM) model. In an exemplary example, a process of generating a video caption by using an SA-LSTM model is shown in FIG. 1.

The SA-LSTM model performs feature extraction on an inputted video 11 first, to obtain visual features 12 ($v_1$, $v_2$, ..., $v_n$) of the video 11. Then, according to a previous hidden state 13 (a hidden state outputted in a $(t-1)^{th}$ time of decoding) and the visual features 12, the SA-LSTM model calculates weights 14 of the visual features 12 for a current decoding process (that is, a $t^{th}$ time of decoding) by using a soft attention mechanism, and then performs weighted summation on the visual features 12 and the weights 14, to obtain context information 15 of the current decoding process. Further, the SA-LSTM model outputs a current hidden state 17 according to the previous hidden state 13, a previous decoded word 16, and the context information 15, and then determines a current decoded word 18 according to the current hidden state 17.

It may be seen that when the video caption is generated by using the SA-LSTM model in the related art, the SA-LSTM model focuses on the visual features only in the current video, and correspondingly, the determined decoded word is related to the visual features of only the current video. However, in an actual situation, the same decoded word may appear in a plurality of video clips, and express similar but not completely the same meanings in different video clips (that is, the decoded word may correspond to similar but not completely the same visual features), causing relatively low accuracy of the decoded word outputted by the SA-LSTM model, and further affecting quality of the finally generated video caption.

To improve the quality of the video caption, different from a structure of "single encoder+single decoder" in the related art, a structure of "encoder+basic decoder+auxiliary decoder" is used in the video caption generating model in the embodiments of the present disclosure, a memory mechanism is creatively introduced, an association between each candidate word in a lexicon and a related video is stored in a memory structure, and the memory structure is added to the auxiliary decoder. The video caption generating model provided in the embodiments of the present disclosure can focus not only on the current video (the basic decoder), but also on another video (the auxiliary decoder) with visual features similar to those of the current video, thereby avoiding a limitation on a focus angle caused by focusing on only the current video, further improving the accuracy of the outputted decoded word, and improving the quality of the generated video caption.

A video caption generating method provided in the embodiments of the present disclosure may be used in any of the following scenarios.

1. Video Classification/Retrieval Scenario

When the video caption generating method is applied to the video classification scenario, the video caption generating model in the embodiments of the present disclosure may be implemented as a video management application program or a part of the video management application program. After video clips including no video caption are inputted to the video management application program, the video management application program extracts visual features in the video clips by using the encoder in the video caption generating model, decodes the visual features by using the basic decoder and the auxiliary decoder separately, determines a decoded word by integrating decoding results of the basic decoder and the auxiliary decoder, and then generates the video caption for the video clips according to the decoded word. For video clips including the video caption, the video management application program classifies the video clips based on the video caption (for example, through semantic recognition), and adds corresponding category labels to the video clips. In the subsequent video retrieval, the video management application program may return, according to a retrieval condition and the category labels corresponding to the video clips, video clips that meet the retrieval condition.

Figure 2:
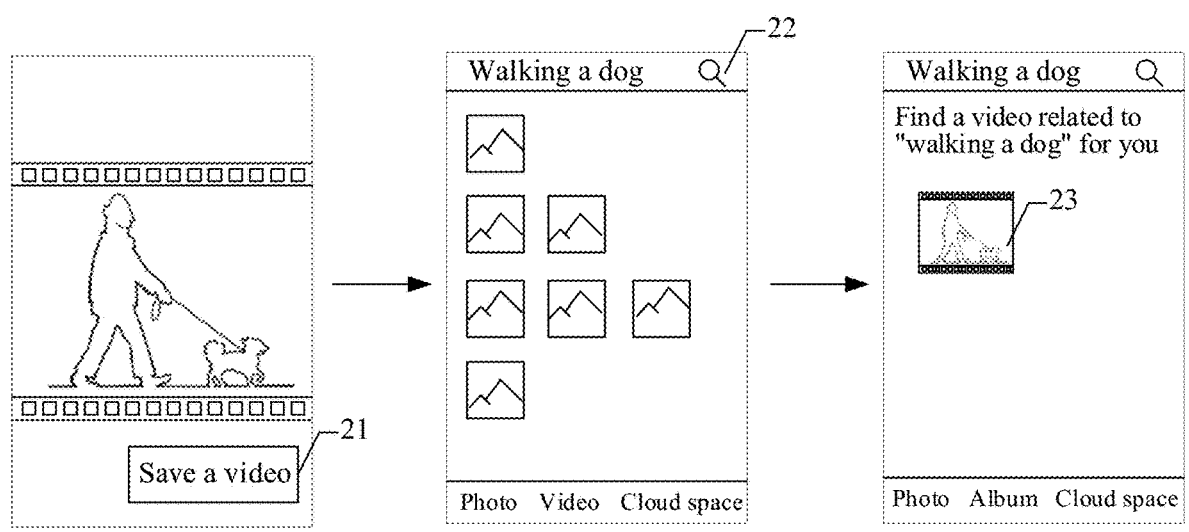
FIG. 2 is a schematic diagram of implementing a video caption generating method in a video classification and retrieval scenario according to one or more embodiments of the present disclosure.

In an exemplary example, as shown in FIG. 2, after shooting a video with a mobile phone, a user taps a storage control 21 to store the video in the mobile phone, the video management application program automatically generates a video caption "a man is walking a dog in a park" for the video in a background, and then adds a category label "walking a dog" to the video according to the generated video caption. Subsequently, when the user may need to retrieve the video from a large number of videos stored in the mobile phone, the user may enter a keyword "walking a dog" in a video retrieval interface 22 of the video management application program, the video management application program matches the keyword with a video category corresponding to each video, and a matched video 23 is displayed as a retrieval result.

2. Visual Question Answering (VQA) Scenario

When the video caption generating method is applied to the VQA scenario, the video caption generating model in the embodiments of the present disclosure may be implemented as an intelligent question answering application program or a part of the intelligent question answering application program. After obtaining a video and a question on the video, the intelligent question answering application program generates a video caption corresponding to the video by using the video caption generating model, performs semantic recognition on the question and the video caption, generates an answer corresponding to the question, and then displays the answer.

3. Scenario of Assistance for a Visually Impaired Person

When the video caption generating method is applied to the scenario of assistance for a visually impaired person, the video caption generating model in the embodiments of the present disclosure may be implemented as a voice prompt application program or a part of the voice prompt application program. After a terminal (for example, an auxiliary device used by the visually impaired person) on which the voice prompt application program is installed acquires an environmental video around the visually impaired person by using a camera, the voice prompt application program encodes and decodes the environmental video by using the video caption generating model, to generate a video caption corresponding to the environmental video. For the generated video caption, the voice prompt application program may convert the video caption from text to voice and perform voice broadcast to help the assistance for a visually impaired person learn the surrounding environment.

Figure 3:
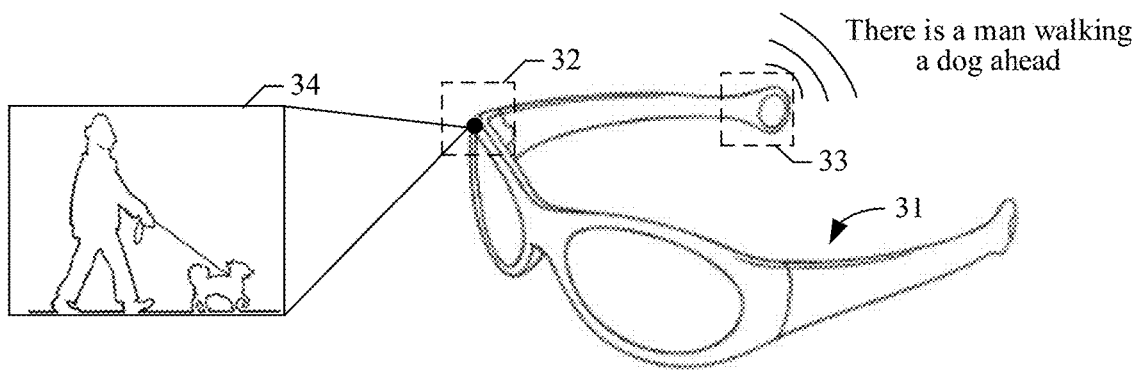
FIG. 3 is a schematic diagram of implementing a video caption generating method in a scenario of assistance for a visually impaired person according to one or more embodiments of the present disclosure.

In an exemplary example, as shown in FIG. 3, glasses 31 worn by a visually impaired person are provided with a camera 32 and a bone conduction headset 33. In a working state, the camera 32 performs image acquisition on a front environment, and acquires an environmental video 34. The glasses 31 generate a video caption "there is a man walking a dog ahead" for the environmental video 34 by using a processor, and convert the video caption from text to voice. The voice is then played through the bone conduction headset 33 to help the visually impaired person dodge according to the voice prompt.

In certain embodiments, in addition to being applied to the foregoing scenarios, the method provided in the embodiments of the present disclosure may be further applied to other scenarios in which the video caption may need to be generated for a video. A specific application scenario is not limited in the embodiments of the present disclosure.

The video caption generating method provided in the embodiments of the present disclosure may be applied to a computer device such as a terminal or a server. In an embodiment, the video caption generating model in the embodiments of the present disclosure may be implemented as an application program or a part of the application program, and is installed in the terminal, to cause the terminal to have a function of generating the video caption; or the video caption generating model may be applied to a backend server of the application program, and the function of generating the video caption is provided by the server for the application program in the terminal.

Figure 4:
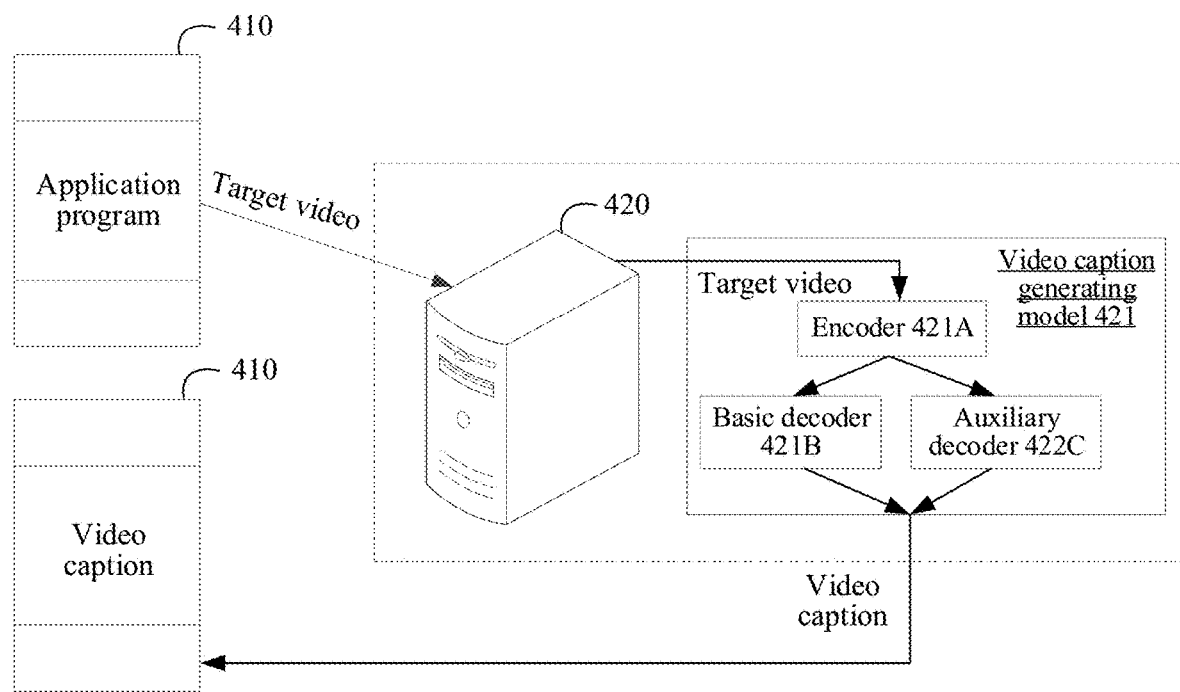
FIG. 4 is a schematic diagram of an implementation environment according to one or more embodiments of the present disclosure.

FIG. 4 is a schematic diagram of an implementation environment according to an exemplary embodiment of the present disclosure. The implementation environment includes a terminal 410 and a server 420. The terminal 410 and the server 420 perform data communication with each other through a communication network. In an embodiment, the communication network may be a wired network or a wireless network, and the communication network may be at least one of a local area network, a metropolitan area network, and a wide area network.

An application program having a video captioning requirement is installed in the terminal 410. The application program may be a video management application program, an intelligent question answering application program, a voice prompt application program, a subtitle generating application program (adding commentary subtitles to a video screen), or the like. This is not limited in this embodiment of the present disclosure. In an embodiment, the terminal may be a mobile terminal such as a mobile phone, a tablet computer, a portable laptop computer, or an auxiliary device for a visually impaired person, or may be a terminal such as a desktop computer or a projection computer. This is not limited in this embodiment of the present disclosure.

The server 420 may be implemented as a server or may be implemented as a server cluster formed by a set of servers, and may be a physical server or may be implemented as a cloud server. In an embodiment, the server 420 is a backend server of the application program in the terminal 410.

As shown in FIG. 4, in this embodiment of the present disclosure, the server 420 stores a video caption generating model 421 trained in advance. In a possible application scenario, when a video caption may need to be automatically generated for a target video, the application program transmits the target video to the server 420 by using the terminal 410, and after receiving the target video, the server 420 inputs the target video to the video caption generating model 421. The video caption generating model 421 performs feature extraction on the target video by using a decoder 421A, decodes an extracted feature by using a basic decoder 421B and an auxiliary decoder 422C separately, generates a video caption according to decoding results, and feeds back the video caption to the terminal 410. The video caption is displayed by the application program in the terminal 410.

In another possible implementation, when the video caption generating model 421 is implemented as a part of the application program in the terminal 410, the terminal 410 may generate the video caption of the target video locally without the help of the server 420, thereby increasing a speed at which the terminal obtains the video caption, and reducing a delay caused by interaction with the server.

Figure 5:
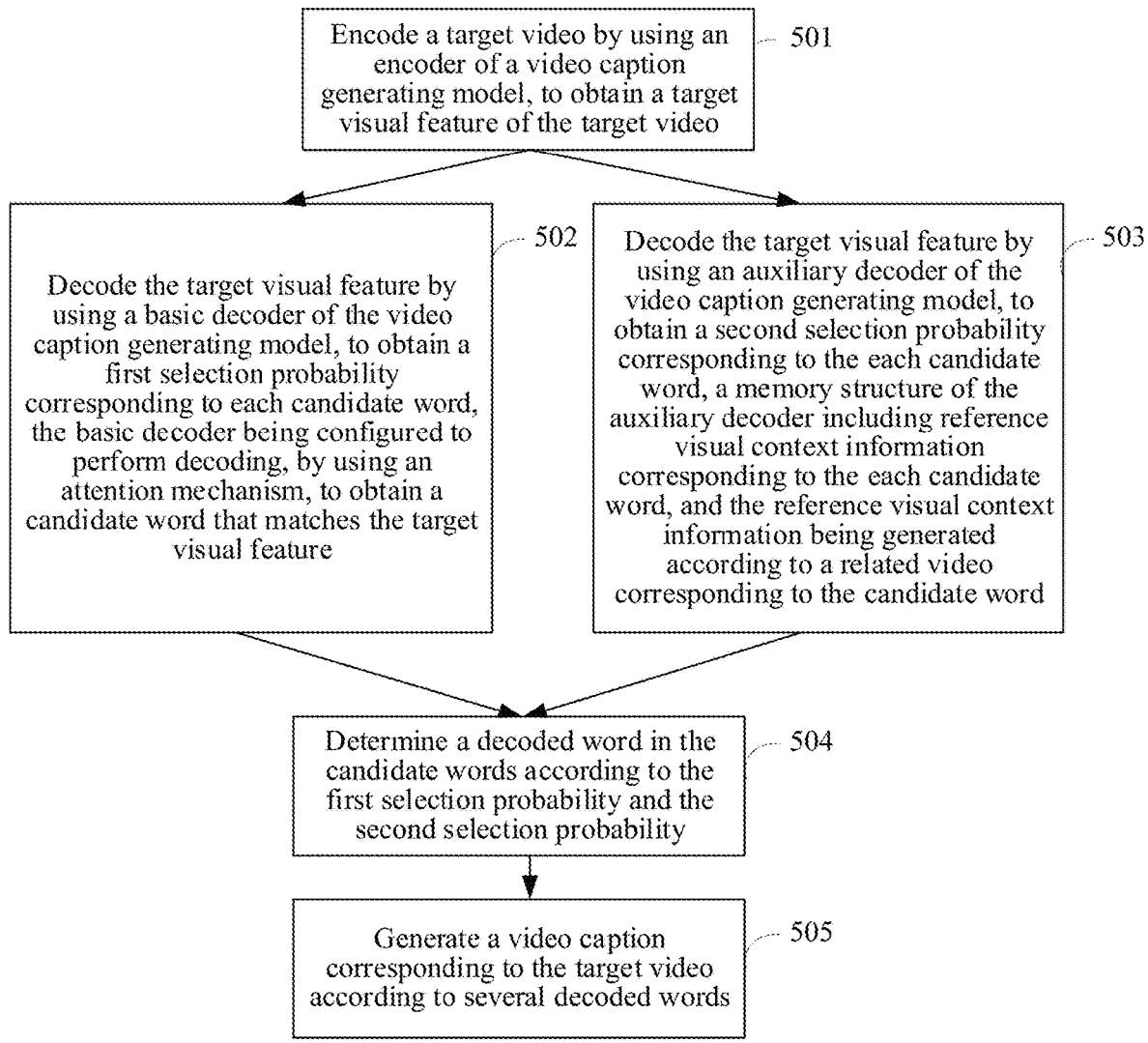
FIG. 5 is a schematic flowchart of a video caption generating method according to one or more embodiments of the present disclosure.

FIG. 5 is a flowchart of a video caption generating method according to an exemplary embodiment of the present disclosure. In this embodiment, description is made by using an example in which the method is applied to a computer device. The method includes the following steps:

Step 501. Encode a target video by using an encoder of a video caption generating model, to obtain a target visual feature of the target video.

In this embodiment of the present disclosure, a function of the encoder of the video caption generating model is to extract the target visual feature from the target video, and input the extracted target visual feature to a decoder (including a basic decoder and an auxiliary decoder). In an embodiment, the target visual feature is represented by using a vector.

In an embodiment, the video caption generating model performs visual feature extraction by using a pre-trained deep convolutional neural network (CNN) as an encoder, and before the feature extraction is performed by using the encoder, the target video may need to be preprocessed, so that the preprocessed target video meets input requirements of the encoder.

For the extracted target visual features, the encoder separately inputs the target visual features to the basic decoder and the auxiliary decoder, and the following step 502 and step 503 are performed. There is no strict sequence between step 502 and step 503, that is, step 502 and step 503 may be performed synchronously. An execution sequence of the two steps is not limited in this embodiment.

Step 502. Decode the target visual feature by using a basic decoder of the video caption generating model, to obtain a first selection probability corresponding to each candidate word, the basic decoder being configured to perform decoding, by using an attention mechanism, to obtain a candidate word that matches the target visual feature.

In an embodiment, the basic decoder focuses on the target video, and performs decoding based on the target visual feature of the target video. In an embodiment, the basic decoder may be a recurrent neural network (RNN) encoder using the attention mechanism. For example, the basic decoder adopts the SA-LSTM model, and when the decoding is performed each time, the basic decoder determines the first selection probability corresponding to the each candidate word in a lexicon according to a hidden state outputted from a previous decoding, a previous decoded word, and the target visual feature by using the attention mechanism. In certain embodiments, in addition to adopting the SA-LSTM model, the basic decoder may alternatively adopt another RNN encoder based on an attention mechanism. This is not limited in this embodiment of the present disclosure.

In an embodiment, a decoding process of the basic decoder is essentially a classification task, that is, calculating the (first) selection probability of the each candidate word in the lexicon by using a softmax function. A larger first selection probability indicates a higher matching degree between the candidate word and context information of a video, that is, the meaning expressed by this candidate word matches the context more closely.

Step 503. Decode the target visual feature by using an auxiliary decoder of the video caption generating model, to obtain a second selection probability corresponding to the each candidate word, a memory structure of the auxiliary decoder including reference visual context information corresponding to the each candidate word, and the reference visual context information being generated according to a related video corresponding to the candidate word.

Different from a case that the basic decoder focuses on the target visual feature of only the target video, the auxiliary decoder in this embodiment focuses on an association between the candidate word and the related video. Therefore, when the auxiliary decoder decodes the target visual features, visual features of the same candidate word in different videos can be captured and matched with the target visual features of the target video, to improve accuracy of determining the decoded word.

In an embodiment, the association between the candidate word and the related video is stored in the memory structure of the auxiliary decoder, and is embodied through a correspondence between the candidate word and the reference visual context information. The reference visual context information corresponding to the candidate word is used for indicating a visual context feature of the related video including the candidate word, and the reference visual context information is generated according to the related video related to the candidate word in a sample video. In the following embodiment, a manner of generating the reference visual context information is described in detail.

In addition to constructing the association between the candidate word and the related video by using the memory structure, the association between the candidate word and the related video may be further constructed by using a graph-based algorithm. This is not limited in the present disclosure.

In an embodiment, similar to the basic decoder, a decoding process of the auxiliary decoder is essentially also a classification task, that is, calculating the (second) selection probability of each candidate word in the lexicon by using the softmax function. The basic decoder and the auxiliary decoder correspond to the same lexicon. A larger second selection probability indicates a higher matching degree between the candidate word and the context information of the video, that is, the meaning expressed by this candidate word matches the context more closely.

Step 504. Determine a decoded word in the candidate words according to the first selection probability and the second selection probability.

Different from the related art in which the decoded word is determined according to a decoding result of only a single decoder, in this embodiment of the present disclosure, the video caption generating model integrates the first selection probability outputted by the basic decoder and the second selection probability outputted by the auxiliary decoder and determines the decoded word obtained by current decoding from each candidate word in the lexicon.

Step 505. Generate a video caption corresponding to the target video according to each decoded word.

Because the video caption is generally a natural language formed by a plurality of decoded words, it may not be necessary to repeat the above step 502 to step 504 each time the decoding is performed. The decoded words of the video caption are sequentially generated, and the plurality of decoded words are connected, to finally generate the video caption.

In view of the above, in this embodiment of the present disclosure, after the target video is encoded by using the encoder of the video caption generating model to obtain the target visual feature, the target visual feature is decoded separately by using the basic decoder based on the attention mechanism and the included auxiliary decoder to obtain the first selection probability and the second selection probability of each candidate word, the first selection probability and the second selection probability are integrated to determine decoded words from the candidate words, and then the video caption is generated according to the plurality of decoded words. Because the memory structure of the auxiliary decoder in the video caption generating model includes the reference visual context information corresponding to the candidate word, and the reference visual context information is generated based on the related video of the candidate word, when decoding is performed by using the auxiliary decoder, an association between the candidate word and another video other than the current video can be focused on, thereby improving accuracy of selecting the decoded word and further improving the quality of the subsequently generated video caption.

Figure 6:
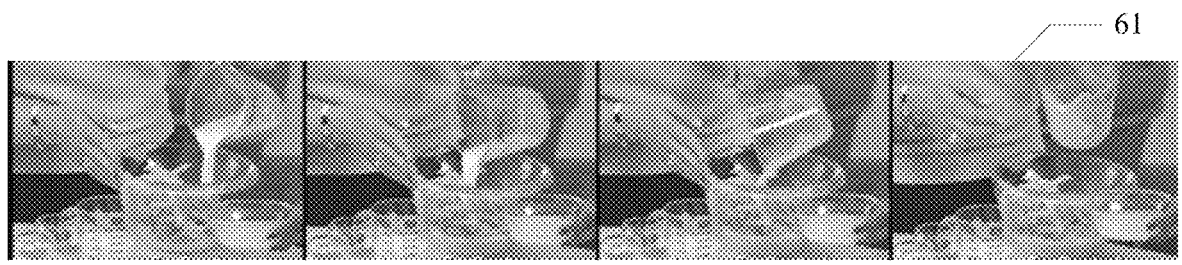
FIG. 6 shows a schematic video caption generated by a video caption generating model according to one or more embodiments of the present disclosure.
Figure 6:
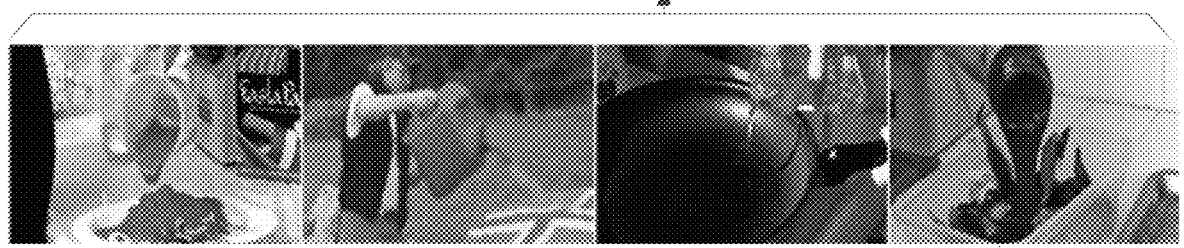

In an exemplary example, as shown in FIG. 6, for the same video 61, a video caption generated by the video caption generating model in the related art is "a woman is mixing ingredients in a bowl.". However, in this embodiment of the present disclosure, a video caption generated by the video caption generating model is "a woman is pouring liquid into a bowl.". It may be seen that the video caption generating model in the related art cannot recognize "pouring" in the video 61. However, in this embodiment of the present disclosure, because the memory structure of the auxiliary decoder includes an association (that is, the reference visual context information) between "pouring" and a related video screen 62, the decoded word "pouring" can be accurately obtained through decoding, thereby improving the captioning quality of the video caption.

The foregoing embodiments briefly describe a working principle of the video caption generating model, and the following provides more detailed descriptions of encoding and decoding processes involved in a process pf generating the video caption by using an exemplary example and with reference to the accompanying drawings.

Figure 7:
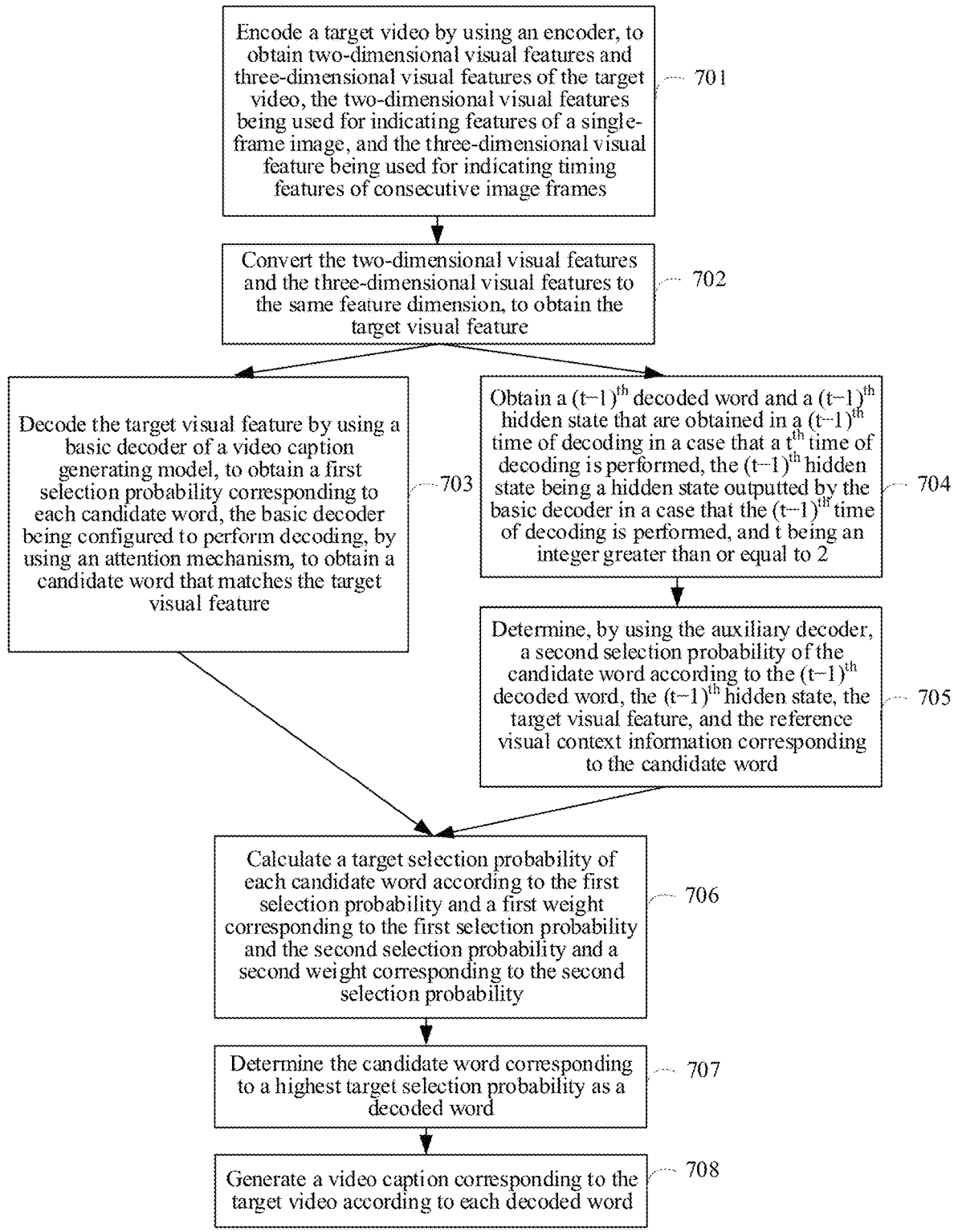
FIG. 7 is a schematic flowchart of a video caption generating method according to one or more embodiments of the present disclosure.

FIG. 7 is a flowchart of a video caption generating method according to another exemplary embodiment of the present disclosure. In this embodiment, description is made by using an example in which the method is applied to a computer device. The method includes the following steps:

Step 701. Encode a target video by using an encoder, to obtain two-dimensional visual features and three-dimensional visual features of the target video, the two-dimensional visual features being used for indicating features of a single-frame image, and the three-dimensional visual feature being used for indicating timing features of consecutive image frames.

Because the video is formed by the consecutive image frames, the visual features of the video include not only image features (that is, the two-dimensional visual features) of the single-frame image, but also the timing features (that is, the three-dimensional visual features) of the consecutive image frames. In an embodiment, the encoder includes a first sub-encoder for extracting the two-dimensional visual features and a second sub-encoder for extracting the three-dimensional visual features.

Correspondingly, when encoding is performed on the target video, the target video is divided into independent image frames, and feature extraction is performed on each image frame by using the first sub-encoder, to obtain the two-dimensional visual features. The target video is divided into several video clips (each video clip includes several consecutive image frames), and the feature extraction is performed on the each video clip by using the second sub-encoder, to obtain the three-dimensional visual features.

In an embodiment, the first sub-encoder uses a ResNet-101 model (residual network with a depth of 101 layers) pre-trained on an ImageNet (large visual database for visual object recognition software research) dataset, and the second sub-encoder uses a ResNeXt-101 model pre-trained on a Kinetics dataset. In certain embodiments, the first sub-encoder and the second sub-encoder may alternatively use other models. This is not limited in this embodiment of the present disclosure.

In an exemplary example, for a target video including L image frames, the target video is encoded by using a decoder to obtain two-dimensional visual features $F_{2D}=\{f_1, f_2, \ldots, f_L\}$ and three-dimensional visual features $F_{3D}=\{v_1, v_2, \ldots, v_N\}$, where N=L/d, d is a quantity of image frames in each video clip.

Figure 8:
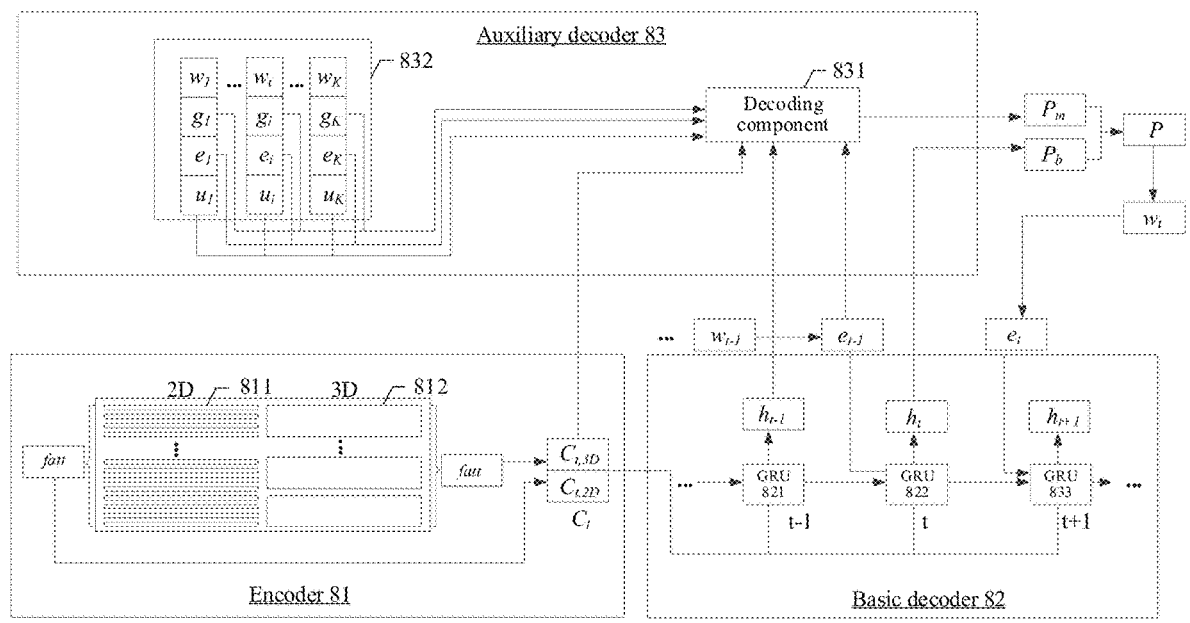
FIG. 8 is a schematic structural diagram of a video caption generating model according to one or more embodiments of the present disclosure.

For example, as shown in FIG. 8, the encoder 81 extracts the two-dimensional visual features 811 and the three-dimensional visual features 812.

Step 702. Convert the two-dimensional visual features and the three-dimensional visual features to the same feature dimension, to obtain the target visual feature.

The feature dimensions (for example, vector size) of the extracted two-dimensional visual features and three-dimensional visual features may be different. Therefore, to uniform the feature dimensions of the visual features and avoid cross contamination of the two-dimensional visual features and the three-dimensional visual features, in an embodiment, the video caption generating model converts the two-dimensional visual features and the three-dimensional visual features to the same feature dimension of hidden space, to obtain the target visual feature.

In an exemplary example, any two-dimensional visual feature $f_l$ is converted into a target visual feature $f'_l=M_f f_l+b_f$, and any three-dimensional visual feature $v_n$ is converted into a target visual feature $v'_n=M_v v_n+b_v$, where $M_f$ and $M_v$ are transformation matrices, and $b_f$ and $b_v$ are bias terms.

Step 703. Decode the target visual feature by using a basic decoder of the video caption generating model, to obtain a first selection probability corresponding to each candidate word, the basic decoder being configured to perform decoding, by using an attention mechanism, to obtain a candidate word that matches the target visual feature.

In an embodiment, the video caption generating model uses gated recurrent units (GRU) as a skeleton of the basic decoder. Schematically, as shown in FIG. 8, a basic decoder 82 includes a GRU 821, a GRU 822, and a GRU 823.

Correspondingly, when the basic decoder performs a $t^{th}$ time of decoding, the following steps may be included.

I. When the $t^{th}$ time of decoding is performed, a $(t-1)^{th}$ decoded word and a $(t-1)^{th}$ hidden state that are obtained in a $(t-1)^{th}$ time of decoding are obtained, where the $(t-1)^{th}$ hidden state is a hidden state outputted by the basic decoder when or in response to determining the $(t-1)^{th}$ time of decoding is performed, and t is an integer greater than or equal to 2.

In each decoding process, the basic decoder outputs a hidden state, and subsequently, the decoded word obtained through current decoding is determined based on the hidden state. In this embodiment of the present disclosure, because the hidden state outputted in the previous decoding and the previous decoded word may be needed when the GRU is configured to output the hidden state, the $(t-1)^{th}$ decoded word and the $(t-1)^{th}$ hidden state may need to be obtained when the basic decoder performs the $t^{th}$ time of decoding.

Schematically, as shown in FIG. 8, when the $t^{th}$ time of decoding is performed, the basic decoder 82 obtains a $(t-1)^{th}$ hidden state $h_{t-1}$ outputted by the GRU 821 and a word vector $e_{t-1}$ corresponding to a $(t-1)^{th}$ decoded word $W_{t-1}$.

II. The first selection probability of the candidate word is determined according to the $(t-1)^{th}$ decoded word, the $(t-1)^{th}$ hidden state, and the target visual feature.

In different decoding stages, correlations between different visual features and the current decoded word are different. Therefore, before the first selection probability is calculated, the basic decoder may further need to process (perform weighted summation on), by using the attention mechanism, the target visual features outputted by the encoder, to obtain target visual context information of the current decoding.

In an embodiment, the basic decoder processes the two-dimensional visual features and the three-dimensional visual features separately, to obtain two-dimensional visual context information and three-dimensional visual context information, and fuses the two-dimensional visual context information and the three-dimensional visual context information, to obtain the target visual context information.

The two-dimensional visual feature $f'_i$ is processed to obtain two-dimensional visual context information $$C_{t,2D} = \sum_{i=1}^{L} a_{i,t} f'_i,$$

where $a_{i,t} = f_{att}(h_{t-1}, f'_i)$, $h_{t-1}$ is the $(t-1)^{th}$ hidden state (vector representation), and $f_{att}$ is an attention function.

The three-dimensional visual feature $V'_i$ is processed to obtain three-dimensional visual context information $$C_{t,3D} = \sum_{i=1}^{N} a'_{i,t} v'_i,$$

where $a'_{i,t} = f_{att}(h_{t-1}, v'_i)$, $h_{t-1}$ is the $(t-1)^{th}$ hidden state (vector representation), and $f_{att}$ is an attention function. In an embodiment, the same attention function is used for processing the two-dimensional visual feature and the three-dimensional visual feature.

The two-dimensional visual context information and the three-dimensional visual context information are fused to obtain target visual context information $c_t[c_{t,2D}; c_{t,3D}]$.

Schematically, as shown in FIG. 8, the attention mechanism ($f_{att}$ in the figure) is used for processing the two-dimensional visual features 811 and three-dimensional visual features 812 separately, to obtain $C_{t,2D}$ and $C_{t,3D}$, and processing results are fused to obtain the target visual context information $C_t$ when the $t^{th}$ time of decoding is performed.

The GRU outputs, when the $t^{th}$ time of decoding is performed, the $t^{th}$ hidden state according to the $(t-1)^{th}$ decoded word, the $(t-1)^{th}$ hidden state, and the target visual context information. A manner in which the GRU determines the $t^{th}$ hidden state may be expressed as:

$$h_t = GRU(h_{t-1}, c_t, e_{t-1})$$

Further, the basic decoder calculates the first selection probability corresponding to each candidate word in the lexicon based on the $t^{th}$ hidden state. A formula for calculating the first selection probability is as follows:

$$P_b(wk) = \frac{\exp\{W_k h_t + b_k\}}{\sum_{i=1}^{K} \exp\{W_i h_t + b_i\}}$$

where $w_i$ is an $i^{th}$ candidate word in the lexicon, K is a total quantity of candidate words in the lexicon, and $W_i$ and $b_i$ are parameters for calculating a linear mapping score of the $i^{th}$ candidate word.

Schematically, as shown in FIG. 8, the target visual context information $C_t$, the $(t-1)^{th}$ hidden state $h_{t-1}$ outputted by the GRU 821, and the word vector $e_{t-1}$ of the $(t-1)^{th}$ decoded word are inputted to the GRU 822, and a first selection probability Pb of the each candidate word is calculated by the GRU 822.

Step 704. Obtain a $(t-1)^{th}$ decoded word and a $(t-1)^{th}$ hidden state that are obtained in a $(t-1)^{th}$ time of decoding when or in response to determining a $t^{th}$ time of decoding is performed, the $(t-1)^{th}$ hidden state being a hidden state outputted by the basic decoder when or in response to determining the $(t-1)^{th}$ time of decoding is performed, and t being an integer greater than or equal to 2.

In an embodiment, similar to the basic decoder, in the decoding process, the auxiliary decoder may also need to use the previous decoded word and the hidden state outputted in the previous decoding. Therefore, when the $t^{th}$ time of decoding is performed, the auxiliary decoder obtains the $(t-1)^{th}$ decoded word and the $(t-1)^{th}$ hidden state. The $(t-1)^{th}$ hidden state is a hidden state outputted by the basic decoder when the $(t-1)^{th}$ time of decoding is performed.

Step 705. Determine, by using the auxiliary decoder, a second selection probability of the candidate word according to the $(t-1)^{th}$ decoded word, the $(t-1)^{th}$ hidden state, the target visual feature, and the reference visual context information corresponding to the candidate word.

Different from the basic decoder, in the decoding process, the auxiliary decoder may further need to obtain the reference visual context information corresponding to the each candidate word in the memory structure, to focus on the visual feature of the candidate word in the related video in the decoding process.

In an embodiment, the memory structure includes at least reference visual context information gr corresponding to the each candidate word and a word feature vector er of the candidate word. Correspondingly, in the decoding process, the auxiliary decoder focuses on calculating a matching degree between the target visual context information corresponding to the candidate word and the reference visual context information, and a matching degree between a word feature vector of the candidate word and a word feature vector of the previous decoded word, and then determines the second selection probability of the candidate word according to the two matching degrees.

Figure 9:
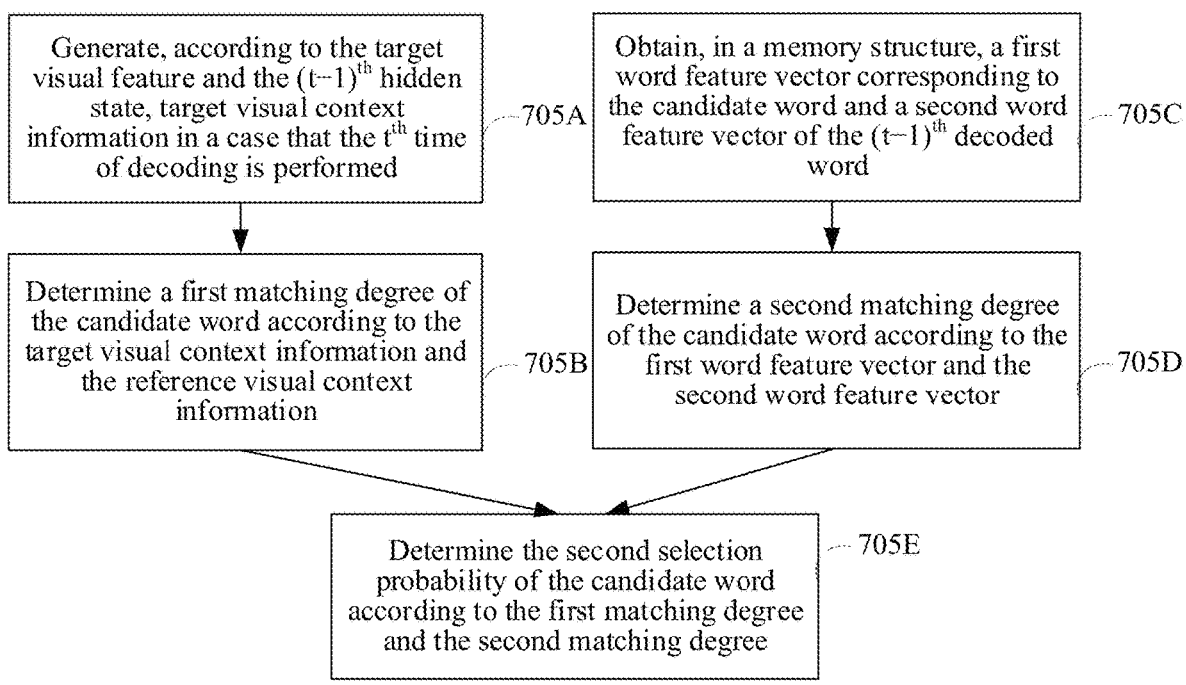
FIG. 9 is a schematic flowchart of a process of determining a selection probability of candidate words by using an auxiliary decoder according to one or more embodiments of the present disclosure.

In an embodiment, as shown in FIG. 9, step 705 may include the following steps:

Step 705A. Generate, according to the target visual feature and the $(t-1)^{th}$ hidden state, the target visual context information when or in response to determining the $t^{th}$ time of decoding is performed.

For a process of generating the target visual context information according to the target visual feature and the $(t-1)^{th}$ hidden state, reference may be made to the foregoing step 703, and details are not described herein again in this embodiment.

In an embodiment, the auxiliary decoder may obtain the target visual context information from the basic decoder and repeated calculation is not required. This is not limited in this embodiment.

Step 705B. Determine a first matching degree of the candidate word according to the target visual context information and the reference visual context information.

Because the reference visual context information corresponding to the candidate word is generated based on the related video corresponding to the candidate word, the reference visual context information may reflect the visual feature of the related video with the candidate word as the decoded word. Correspondingly, when the matching degree between the reference visual context information corresponding to the candidate word and the target visual context information when the current decoding is performed is higher, a matching degree between the candidate word and the target visual context information is also higher.

In an embodiment, the auxiliary decoder determines a matching degree between the target visual context information and the reference visual context information as the first matching degree of the candidate word, and the first matching degree may be expressed as: $[W_c \cdot c_t + W_g \cdot g_i]$, where $W_c$ and $W_g$ are linear transformation matrices, and is reference visual context information corresponding to an ith candidate word.

Step 705C. Obtain, in the memory structure, a first word feature vector corresponding to the candidate word and a second word feature vector of the (t−1)th decoded word.

In addition to determining the matching degree of the candidate word according to the visual context information, the auxiliary decoder further determines the matching degree of the candidate word according to the semantics of the candidate word and the previous decoded word, thereby improving a coherence of the decoded word obtained through subsequent decoding and the previous decoded word.

In an embodiment, the auxiliary decoder obtains, from the memory structure, the first word feature vector corresponding to the candidate word, and converts the (t−1)th decoded word to the second word feature vector through a transformation matrix.

Step 705D. Determine a second matching degree of the candidate word according to the first word feature vector and the second word feature vector.

In an embodiment, the auxiliary decoder determines a matching degree between the first word feature vector and the second word feature vector as the second matching degree of the candidate word, and the second matching degree may be expressed as: $[W'_e \cdot e_{t-1} + W_e \cdot e_i]$, where $W'_e$ and $W_e$ are linear transformation matrices, and $e_i$ is a word feature vector corresponding to an ith candidate word.

There is no strict sequence between the foregoing steps 705A and 705B and steps 705C and 705D, that is, steps 705A and 705B may be performed synchronously with steps 705C and 705D. This is not limited in this embodiment of the present disclosure.

Step 705E. Determine the second selection probability of the candidate word according to the first matching degree and the second matching degree.

In an embodiment, the second selection probability is in a positive correlation with the first matching degree and the second matching degree, that is, a higher first matching degree and a higher second matching degree indicate a higher second selection probability of the candidate word.

In an embodiment, to improve decoding accuracy, in addition to including the reference visual context information gr corresponding to the candidate word and the word feature vector er of the candidate word, the memory structure further includes auxiliary information ur corresponding to the candidate word. The auxiliary information may be a part of speech of the candidate word, a field of the candidate word, a category of a video that commonly uses the candidate word, or the like.

Correspondingly, the auxiliary decoder determines the second selection probability of the candidate word according to the auxiliary information, the (t−1)th decoded word, the (t−1)th hidden state, the target visual feature, and the reference visual context information corresponding to the candidate word.

In an embodiment, a second selection probability $P_m$ of a candidate word $w_k$ may be expressed as:

$$P_m(wk) = \frac{\exp\{q_k\}}{\sum_{k=1}^{K} \exp\{q_k\}}$$

where $q_k$ is a relevance score of the candidate word $w_k$, and K is a total quantity of candidate words in the lexicon.

In an embodiment, a formula for calculating the relevance score of the candidate word is as follows:

$$q_i = v^T \tan h([W_c \cdot c_t + W_g \cdot g_i] + [W'_e \cdot e_{t-1} + W_e \cdot e_i] + W_h \cdot h_{t-1} + W_u \cdot u_i + b)$$

where $W_h$ and $W_u$ are linear transformation matrices, $u_i$ is auxiliary information corresponding to an ith candidate word, and b is a bias term.

Schematically, as shown in FIG. 8, a memory structure 832 of an auxiliary decoder 83 includes reference visual context information gi, a word feature vector ei, and auxiliary information ui that correspond to each candidate word (wi). When the tth time of decoding is performed, content in the memory structure 832, the target visual context information Ct, the (t−1)th hidden state ht−1, and the word feature vector et−1 of the (t−1)th decoded word are inputted to a decoding component 831, and a second selection probability Pm of the each candidate word is outputted by the decoding component 831.

Step 706. Calculate a target selection probability of each candidate word according to the first selection probability and a first weight corresponding to the first selection probability and the second selection probability and a second weight corresponding to the second selection probability.

In an embodiment, for the each candidate word in the lexicon, the video caption generating model obtains the first selection probability and the second selection probability that correspond to the candidate word, and performs weighted calculation, according to weights respectively corresponding to the selection probabilities, to obtain the target selection probability of the candidate word.

Schematically, a formula for calculating the target selection probability of the candidate word $w_k$ is as follows:

$$P(w_k)=(1-\lambda)P_b(w_k)+\lambda P_m(w_k)$$

where $\lambda$ is the second weight, and $(1-\lambda)$ is the first weight.

In an embodiment, the first weight and the second weight are hyper-parameters obtained experimentally, and the first weight is greater than the second weight. For example, a value range of A is (0.1, 0.2).

Step 707. Determine the candidate word corresponding to a highest target selection probability as a decoded word.

Further, the video caption generating model obtains the target selection probability of the each candidate word, and determines the candidate word corresponding to the highest target selection probability as the decoded word obtained through the current decoding.

Schematically, as shown in FIG. 8, the video caption generating model calculates the target selection probability P according to the first selection probability Pb and the second selection probability Pm, and determines a tth decoded word wt based on the target selection probability P.

Step 708. Generate a video caption corresponding to the target video according to each decoded word.

Figure 10:
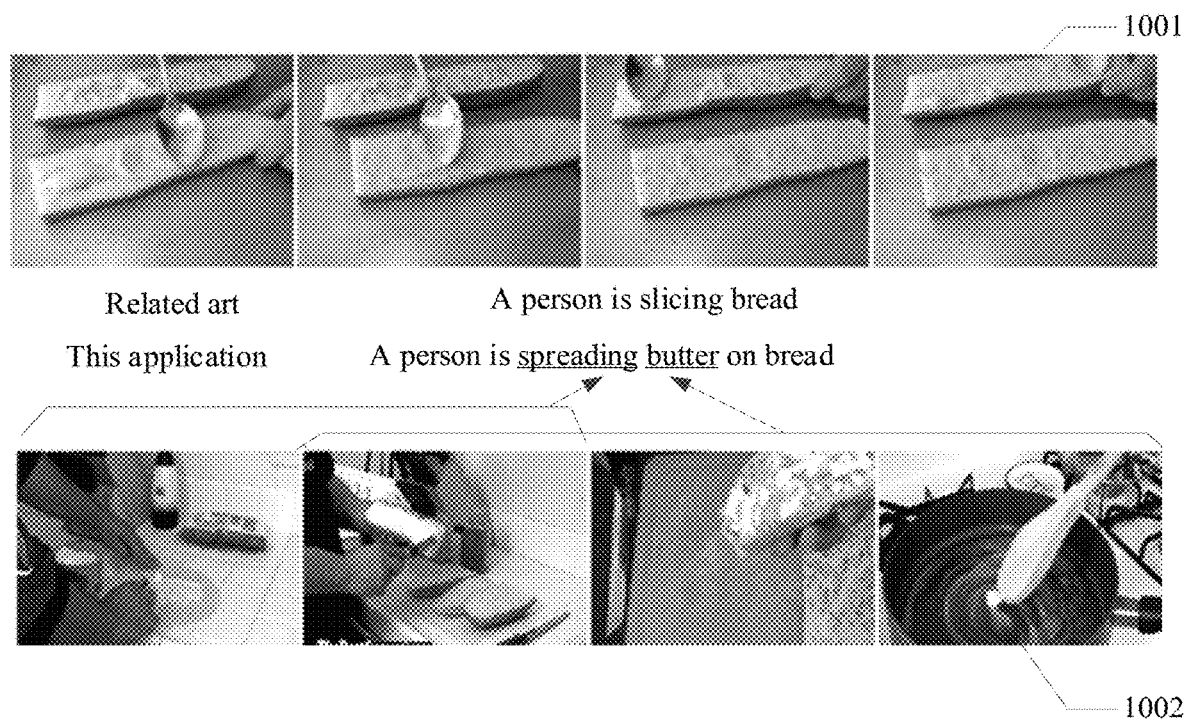
FIG. 10 shows a schematic video caption generated by video caption generating models in the related art and the embodiments of the present disclosure according to one or more embodiments of the present disclosure.

In an exemplary example, as shown in FIG. 10, for the same video 1001, a video caption generated by the video caption generating model in the related art is "a person is slicing bread". However, a video caption generated by the video caption generating model in this embodiment of the present disclosure is "a person is spreading butter on bread". It may be seen that the video caption generating model in the related art cannot recognize "spreading" and "butter" in the video 1001. However, in this embodiment of the present disclosure, because the memory structure of the auxiliary decoder includes an association (that is, the reference visual context information) between "spreading" and "butter" and a related video screen 1002, the decoded words "spreading" and "butter" can be accurately obtained through decoding, thereby improving the quality of the video caption.

In this embodiment, the video caption generating model decodes, by using the decoder, the target video to obtain the two-dimensional visual features and the three-dimensional visual features, and maps the two-dimensional visual features and the three-dimensional visual features to the same feature dimension, thereby improving comprehensiveness of the visual feature extraction and avoiding cross contamination of the two-dimensional visual features and the three-dimensional visual features.

In addition, in this embodiment, the auxiliary decoder determines a selection probability of the candidate word according to the reference visual context information of the candidate word and the target visual context information of the current decoding, helping improve accuracy of a finally determined decoded word. Meanwhile, the auxiliary decoder determines the selection probability of the candidate word according to word feature vectors of the candidate word and the previous decoded word, helping improve a coherence of the finally determined decoded word and the previous decoded word.

Figure 11:
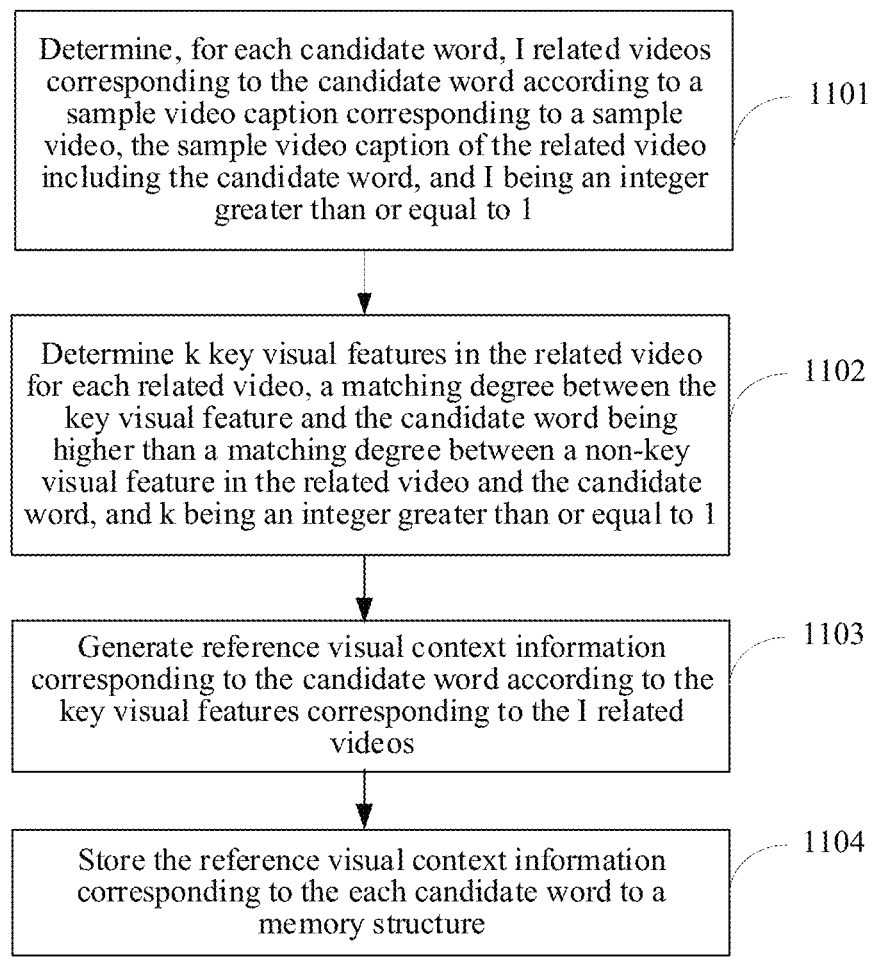
FIG. 11 is a schematic flowchart of a process of generating reference visual context information corresponding to a candidate word according to one or more embodiments of the present disclosure.

For a process of generating the reference visual context information corresponding to the candidate word in the foregoing embodiment, in an embodiment, as shown in FIG. 11, the generating process may include the following steps:

Step 1101. Determine, for each candidate word, I related videos corresponding to the candidate word according to a sample video caption corresponding to a sample video, the sample video caption of the related video including the candidate word, and I being an integer greater than or equal to 1.

In an embodiment, a developer generates and adds a sample video caption for the sample video in a manual annotation manner; or an existing video caption generating model is used to automatically generate sample video captions for the sample video, and a sample video caption whose quality is below expectations is manually filtered out.

When the related video corresponding to the each candidate word in the lexicon is determined, a computer device obtains a sample video caption corresponding to each sample video, and determines a video whose sample video caption includes the candidate word as a related video of the candidate word.

In an exemplary example, for a candidate word "walking", if a video caption corresponding to a sample video A is "a man is leading a dog", and a video caption corresponding to a sample video B is "a man and a woman are walking in a park", the computer device determines the sample video B as a related video corresponding to "walking".

Step 1102. Determine k key visual features in the related video for each related video, a matching degree between the key visual feature and the candidate word being higher than a matching degree between a non-key visual feature in the related video and the candidate word, and k being an integer greater than or equal to 1.

For the related video corresponding to the each candidate word, because not all the image frames (or video clips) in the related video are related to the candidate word, the computer device may need to determine the key visual features related to the candidate word in the each related video. In certain embodiments, the non-key visual feature is a visual feature other than the key visual features in the each related video.

In an embodiment, the determining the key visual features in the related video may include the following steps:

I. Obtain a feature weight of each visual feature in a related video for a candidate word by using a basic decoder, where a sum of the feature weights is 1.

In an embodiment, the computer device trains the basic decoder in the video caption generating model first, and obtains the feature weight of the each visual feature in the related video for the candidate word by using the basic decoder (which uses an attention mechanism) when the candidate word is decoded.

In an exemplary example, when the candidate word is a tth decoded word in the sample video caption corresponding to the sample video, the computer device decodes the visual feature of the sample video by using the basic decoder, and obtains a (t−1)th hidden state ht−1 outputted by the basic decoder when the tth time of decoding is performed, to calculate a feature weight ai,t of each visual feature (including v'i or f'i) for the candidate word by using an attention function fatt.

II. Determine the visual features corresponding to the first k feature weights as the key visual features.

The larger feature weight of the visual feature for the candidate word indicates a higher correlation between the visual feature and the candidate word. Therefore, the computer device may determine the visual features corresponding to the first k (Top-k) feature weights as the key visual features of the candidate word.

Figure 12:
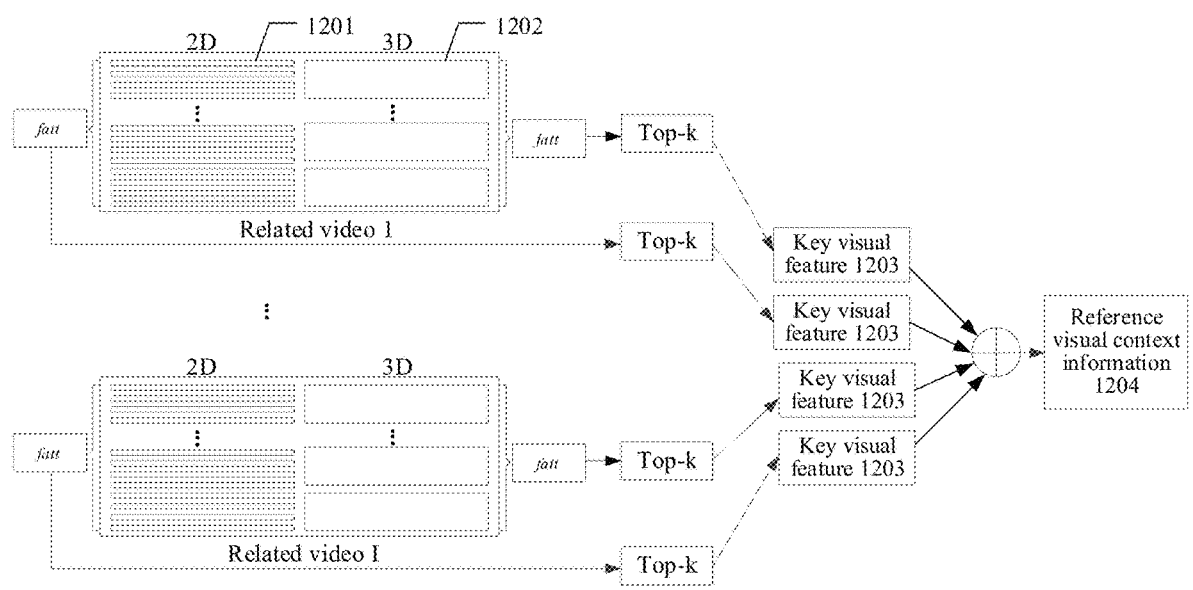
FIG. 12 is a schematic diagram of implementing a process of generating reference visual context information according to one or more embodiments of the present disclosure.

Schematically, as shown in FIG. 12, for I related videos corresponding to the candidate word, the computer device respectively extracts two-dimensional visual features 1201 and three-dimensional visual features 1202 of the related videos, obtains feature weights of visual features in the related videos for the candidate word by using the attention mechanism of the basic decoder, and selects, from the visual features, visual features corresponding to the Top-k feature weights as key visual features 1203.

Step 1103. Generate reference visual context information corresponding to the candidate word according to the key visual features corresponding to the I related videos.

Further, the computer device fuses the key visual features corresponding to the related videos to generate the reference visual context information corresponding to the candidate word.

The reference visual context information gr corresponding to the candidate word may be expressed as:

$$g_r = \frac{\sum_{i=1}^{I}\sum_{j=1}^{k} a_{i,j} f'_{i,j}}{\sum_{i=1}^{I}\sum_{j=1}^{k} a_{i,j}} + \frac{\sum_{i=1}^{I}\sum_{j=1}^{k} a'_{i,j} v'_{i,j}}{\sum_{i=1}^{I}\sum_{j=1}^{k} a'_{i,j}}$$

where I is a quantity of related videos, k is a quantity of key visual features corresponding to each related video, $a_{i,j}$ is a feature weight of a jth two-dimensional key visual feature $f'_{i,j}$ for the candidate word, and $a'_{i,j}$ is a feature weight of a jth three-dimensional key visual feature $v'_{i,j}$ for the candidate word.

Schematically, as shown in FIG. 12, the computer device fuses the key visual features 1203 corresponding to the related videos to generate reference visual context information 1204.

Step 1104. Store the reference visual context information corresponding to the each candidate word to a memory structure.

Further, the computer device stores the reference visual context information corresponding to the each candidate word to the memory structure of the auxiliary decoder for subsequent use.

In this embodiment, the computer device extracts the key visual features of the candidate word from the related video corresponding to the candidate word, generates the reference visual context information of the candidate word according to a large quantity of key visual features, and stores the reference visual context information to the memory structure, helping improve accuracy of a decoded word obtained through subsequent decoding.

Quality of the video captions of the video caption generating models in the related art and the embodiments of the present disclosure is analyzed on an MSR-VTT dataset, and obtained analysis results are shown in Table 1.

TABLE 1

| Model | BLEU-4 | METEOR | ROUGE-L | CIDEr |
|---|---|---|---|---|
| S2VT | 31.4 | 25.7 | 55.9 | 35.2 |
| MP-LSTM (VGG19) | 34.8 | 24.7 | — | — |
| SA-LSTM (VGG19) | 35.6 | 25.4 | — | — |
| SA-LSTM (Inception-V4) | 36.3 | 25.5 | 58.3 | 39.9 |
| RecNetlocal | 39.1 | 26.6 | 59.3 | 42.7 |
| VideoLAB | 39.1 | 27.7 | 60.6 | 44.1 |
| PickNet (V + L + C) | 41.3 | 27.7 | 59.8 | 44.1 |
| Aalto | 39.8 | 26.9 | 59.8 | 45.7 |
| ruc-uav | 38.7 | 26.9 | 58.7 | 45.9 |
| Basic decoder | 40.1 | 27.7 | 60.4 | 45.7 |
| Basic decoder + auxiliary decoder (the present disclosure) | 40.4 | 28.1 | 60.7 | 47.1 |

Quality of the video captions of the video caption generating models in the related art and the embodiments of the present disclosure is analyzed on an MSVD dataset, and obtained analysis results are shown in Table 2.

TABLE 2

| Model | BLEU-4 | METEOR | ROUGE-L | CIDEr |
|---|---|---|---|---|
| MP-LSTM (AlexNet) | 33.3 | 29.1 | — | — |
| GRU-RCN | 43.3 | 31.6 | — | 68.0 |
| HRNE | 43.8 | 33.1 | — | — |
| LSTM-E | 45.3 | 31.0 | — | — |
| LSTM-LS (VGG19 + C3D) | 51.1 | 32.6 | — | — |
| h-RNN | 49.9 | 32.6 | — | 65.8 |
| S2VT (Inception-V4) | 39.6 | 31.2 | 67.5 | 66.7 |
| aLSTMs | 50.8 | 33.3 | — | 74.8 |
| SA-LSTM (Inception-V4) | 45.3 | 31.9 | 64.2 | 76.2 |
| TSA-ED | 51.7 | 34.0 | — | 74.9 |
| PickNet (V + L) | 52.3 | 33.3 | 69.6 | 76.5 |
| RecNet$_{local}$ (SA-LSTM) | 52.3 | 34.1 | 69.8 | 80.3 |
| Basic decoder | 47.5 | 34.4 | 71.4 | 89.9 |
| Basic decoder + auxiliary decoder (the present disclosure) | 48.6 | 35.1 | 71.9 | 92.2 |

It may be seen from the analysis results that the video caption generating model in the embodiments of the present disclosure is leading in each of four evaluation indicators (BLEU-4, METEOR, ROUGE-L, and CIDEr).

In certain embodiments, although the steps are displayed sequentially according to the instructions of the arrows in the flowcharts of the embodiments, the steps are not necessarily performed sequentially according to the sequence instructed by the arrows. Unless otherwise explicitly specified in this specification, execution of the steps is not strictly limited, and the steps may be performed in other orders. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 13:
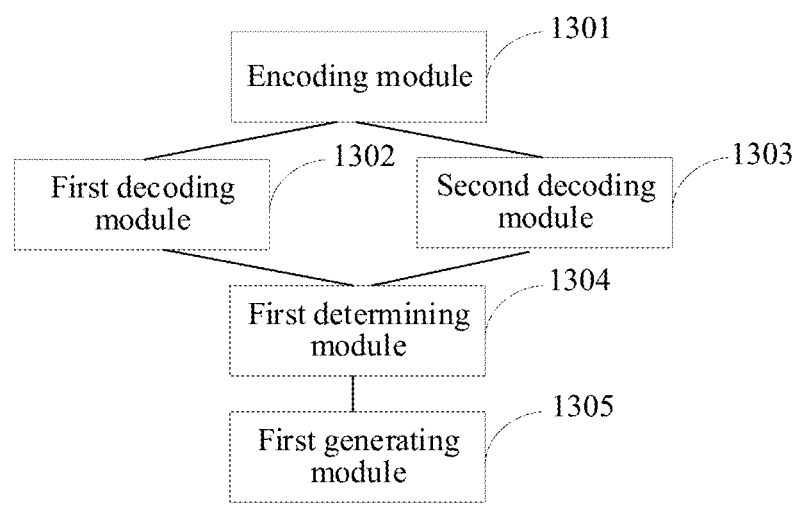
FIG. 13 is a schematic structural block diagram of a video caption generating apparatus according to one or more embodiments of the present disclosure.

FIG. 13 is a structural block diagram of a video caption generating apparatus according to an exemplary embodiment of the present disclosure. The apparatus may be disposed in the computer device described in the foregoing embodiment. As shown in FIG. 13, the apparatus includes: an encoding module 1301, configured to encode a target video by using an encoder of a video caption generating model, to obtain a target visual feature of the target video; a first decoding module 1302, configured to decode the target visual feature by using a basic decoder of the video caption generating model and an attention mechanism, to obtain a first selection probability corresponding to each candidate word; a second decoding module 1303, configured to decode the target visual feature by using an auxiliary decoder of the video caption generating model, to obtain a second selection probability corresponding to the each candidate word, a memory structure of the auxiliary decoder including reference visual context information corresponding to the each candidate word, and the reference visual context information being generated according to a related video corresponding to the candidate word; a first determining module 1304, configured to determine a decoded word in the candidate words according to the first selection probability and the second selection probability; and a first generating module 1305, configured to generate a video caption corresponding to the target video according to each decoded word.

In an embodiment, the second decoding module 1303 includes: a first obtaining unit, configured to obtain a (t−1)th decoded word and a (t−1)th hidden state that are obtained in a (t−1)th time of decoding when or in response to determining a tth time of decoding is performed, the (t−1)th hidden state being a hidden state outputted by the basic decoder when or in response to determining the (t−1)th time of decoding is performed, and t being an integer greater than or equal to 2; and a first determining unit, configured to determine the second selection probability of the candidate word according to the (t−1)th decoded word, the (t−1)th hidden state, the target visual feature, and the reference visual context information corresponding to the candidate word.

In an embodiment, the first determining unit is configured to: generate, according to the target visual feature and the (t−1)th hidden state, target visual context information when or in response to determining a tth time of decoding is performed; determine a first matching degree of the candidate word according to the target visual context information and the reference visual context information; obtain, in the memory structure, a first word feature vector corresponding to the candidate word and a second word feature vector of the (t−1)th decoded word; determine a second matching degree of the candidate word according to the first word feature vector and the second word feature vector; and determine the second selection probability of the candidate word according to the first matching degree and the second matching degree.

In an embodiment, the memory structure further includes auxiliary information corresponding to the each candidate word. The first determining unit is configured to: determine the second selection probability of the candidate word according to the auxiliary information, the (t−1)th decoded word, the (t−1)th hidden state, the target visual feature, and the reference visual context information corresponding to the candidate word.

In an embodiment, an apparatus includes: a second determining module, configured to: determine, for each candidate word, I related videos corresponding to the candidate word according to a sample video caption corresponding to a sample video, the sample video caption of the related video including the candidate word, and I being an integer greater than or equal to 1; a third determining module, configured to determine k key visual features in the related video for each related video, a matching degree between the key visual feature and the candidate word being higher than a matching degree between a non-key visual feature in the related video and the candidate word, and k being an integer greater than or equal to 1; a second generating module, configured to generate the reference visual context information corresponding to the candidate word according to the key visual features corresponding to the I related videos; and a storage module, configured to store the reference visual context information corresponding to the each candidate word to the memory structure.

In an embodiment, the third determining module includes: an obtaining unit, configured to obtain a feature weight of each visual feature in the related video for the candidate word by using the basic decoder, a sum of the feature weights being 1; and a second determining unit, configured to determine the visual features corresponding to the first k feature weights as the key visual features.

In an embodiment, the first determining module 1304 includes: a calculation unit, configured to calculate a target selection probability of each candidate word according to the first selection probability and a first weight corresponding to the first selection probability and the second selection probability and a second weight corresponding to the second selection probability; and a third determining unit, configured to determine the candidate word corresponding to a highest target selection probability as a decoded word.

In an embodiment, the encoding module 1301 includes: an encoding unit, configured to encode a target video by using an encoder, to obtain two-dimensional visual features and three-dimensional visual features of the target video, the two-dimensional visual features being used for indicating features of a single-frame image, and the three-dimensional visual feature being used for indicating timing features of consecutive image frames; and a conversion unit, configured to convert the two-dimensional visual features and the three-dimensional visual features to the same feature dimension, to obtain the target visual feature.

In view of the above, in this embodiment of the present disclosure, after the target video is encoded by using the encoder of the video caption generating model to obtain the target visual feature, the target visual feature is decoded separately by using the basic decoder based on the attention mechanism and the included auxiliary decoder to obtain the first selection probability and the second selection probability of each candidate word, the first selection probability and the second selection probability are integrated to determine decoded words from the candidate words, and then the video caption is generated according to the plurality of decoded words. Because the memory structure of the auxiliary decoder in the video caption generating model includes the reference visual context information corresponding to the candidate word, and the reference visual context information is generated based on the related video of the candidate word, when decoding is performed by using the auxiliary decoder, an association between the candidate word and another video other than the current video can be focused on, thereby improving accuracy of selecting the decoded word and further improving the quality of the subsequently generated video caption.

The video caption generating apparatus provided in the foregoing embodiments is illustrated with an example of division of the foregoing functional modules. In practical application, the foregoing functions may be allocated to and performed by different functional modules or units according to requirements, that is, the internal structure of the apparatus is divided into different functional modules or units, so as to perform all or part of the functions described above. Each functional module or unit may be implemented entirely or partly by software, hardware, or a combination thereof. Moreover, the embodiments of the video caption generating apparatus provided in the foregoing embodiments belong to the same concept as that of the embodiments of the video caption generating method. For details of a specific implementation process thereof, refer to the method embodiments. Details are not described herein again.

Figure 14:
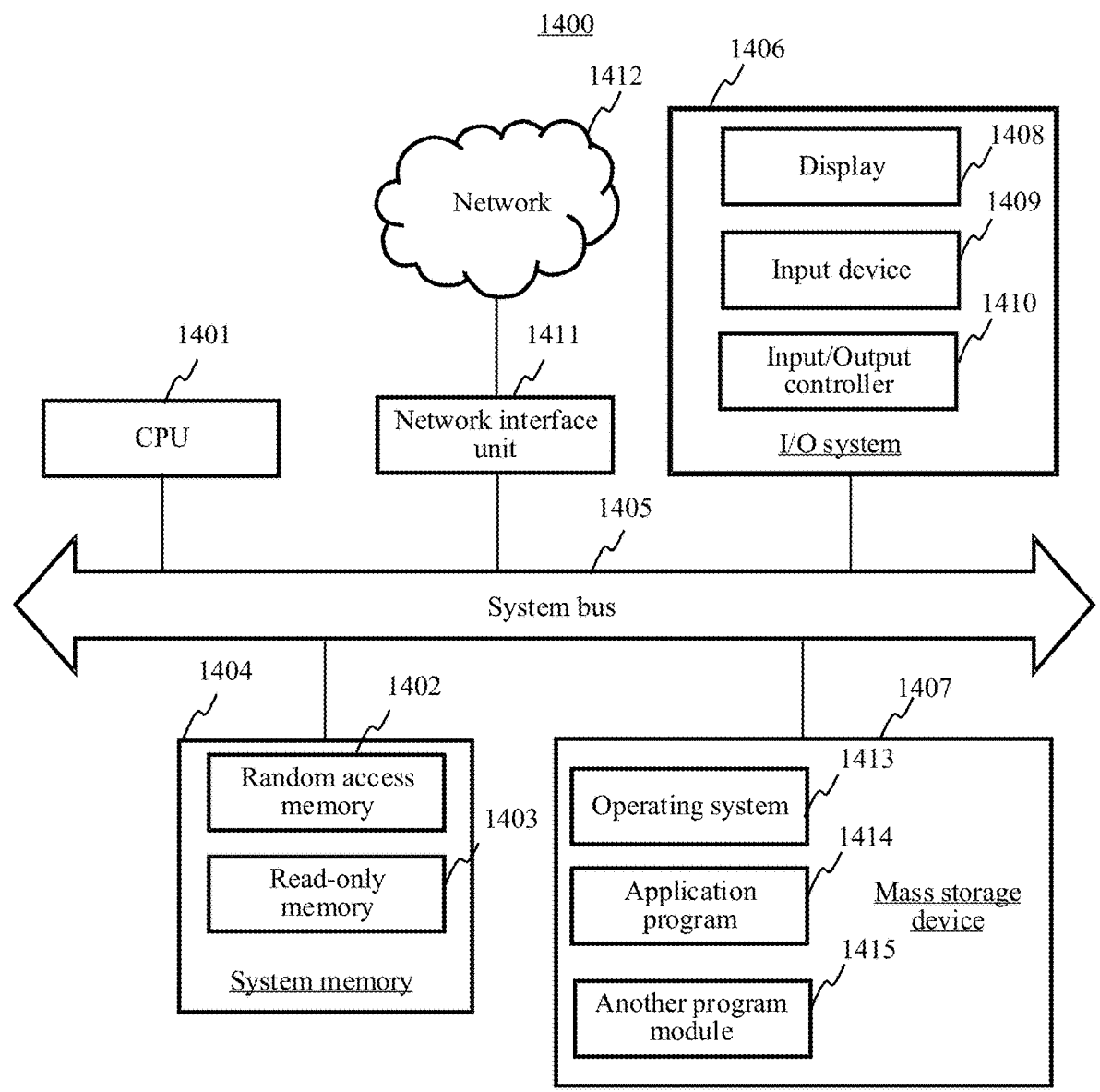
FIG. 14 is a schematic structural diagram of a computer device according to one or more embodiments of the present disclosure.

FIG. 14 is a schematic structural diagram of a computer device according to an exemplary embodiment of the present disclosure. Specifically, the computer device 1400 includes a central processing unit (CPU) 1401, a system memory 1404 including a random access memory (RAM) 1402 and a read-only memory (ROM) 1403, and a system bus 1405 connecting the system memory 1404 and the CPU 1401. The computer device 1400 further includes a basic input/output system (I/O system) 1406 assisting in transmitting information between components in the computer, and a mass storage device 1407 configured to store an operating system 1413, an application program 1414, and another program module 1415.

The basic I/O system 1406 includes a display 1408 configured to display information, and an input device 1409 configured to allow a user to enter information, for example, a mouse or a keyboard. The display 1408 and the input device 1409 are both connected to the central processing unit 1401 by using the system bus 1405 connected to an input/output controller 1410. The basic I/O system 1406 may further include the input/output controller 1410 to receive and process inputs from a plurality of other devices such as a keyboard, a mouse, and an electronic stylus. Similarly, the input/output controller 1410 further provides an output to a display screen, a printer or another type of output device.

The mass storage device 1407 is connected to the CPU 1401 by using a mass storage controller (not shown) connected to the system bus 1405. The mass storage device 1407 and a computer-readable medium associated with the large-capacity storage device provide non-volatile storage to the computer device 1400. That is, the mass storage device 1407 may include the computer-readable medium (not shown) such as a hard disk or a CD-ROI driver.

In general, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. In certain embodiments, a person skilled in the art can know that the computer storage medium is not limited to the foregoing several types. The system memory 1404 and the mass storage device 1407 may be collectively referred to as a memory.

The memory stores one or more programs, and the one or more programs are configured to be executed by one or more CPUs 1401. The one or more programs include computer-readable instructions used for implementing the foregoing method, and the CPU 1401 executes the one or more programs to implement the method provided in the foregoing method embodiments.

According to the embodiments of the present disclosure, the computer device 1400 may be further connected, through a network such as the Internet, to a remote computer on the network and run. That is, the computer device 1400 may be connected to a network 1412 by using a network interface unit 1411 connected to the system bus 1405, or may be connected to another type of network or a remote computer system (not shown) by using a network interface unit 1411.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The memory further includes one or more programs. The one or more programs are stored in the memory, and include steps performed by the computer device for implementing the method provided in the embodiments of the present disclosure.

The embodiments of the present disclosure further provide one or more computer-readable storage media, storing at least one computer-readable instruction, at least one program, a code set, or a computer-readable instruction set, the at least one computer-readable instruction, the at least one program, the code set, or the computer-readable instruction set being loaded and executed by one or more processors to implement the video caption generating method in any one of the foregoing embodiments.

The present disclosure further provides a computer program product, the computer program product, when run on a computer, causing the computer to perform the video caption generating method in the foregoing method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one computer-readable instruction, at least one program, a code set, or a computer-readable instruction set, the at least one computer-readable instruction, the at least one program, the code set, or the computer-readable instruction set being loaded and executed by a processor to implement the video caption generating method in any one of the foregoing method embodiments.

In some embodiments, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing embodiments of the present disclosure are merely for description purpose, and are not intended to indicate priorities of the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

What is claimed is:

1. A video caption generating method, performed by a computer device, the method comprising:
   encoding a target video by using an encoder of a video caption generating model, to obtain a target visual feature of the target video;
   decoding the target visual feature by using a basic decoder of the video caption generating model, to obtain a first selection probability corresponding to each candidate word of a plurality of candidate words;
   decoding the target visual feature of the target video by using an auxiliary decoder of the video caption generating model, to obtain a second selection probability corresponding to the each candidate word, wherein a memory of the auxiliary decoder stores reference visual context information corresponding to the each candidate word, and the reference visual context information has been generated according to at least one related video corresponding to the each candidate word;

determining a decoded word from the plurality of candidate words according to the first selection probability and the second selection probability of the each candidate word; and generating a video caption corresponding to the target video according to the decoded word.

2. The method according to claim 1, wherein decoding the target visual feature by using the auxiliary decoder comprises:

obtaining a $(t-1)^{th}$ decoded word and a $(t-1)^{th}$ hidden state that are obtained in a $(t-1)^{th}$ time of decoding in response to determining a $t^{th}$ time of decoding is performed, the $(t-1)^{th}$ hidden state being a hidden state outputted by the basic decoder in response to determining the $(t-1)^{th}$ time of decoding is performed, and t being an integer greater than or equal to 2; and determining, by using the auxiliary decoder, the second selection probability of the each candidate word according to the $(t-1)^{th}$ decoded word, the $(t-1)^{th}$ hidden state, the target visual feature, and the reference visual context information corresponding to the each candidate word.

3. The method according to claim 2, wherein determining the second selection probability of the each candidate word comprises:

generating, according to the target visual feature and the $(t-1)^{th}$ hidden state, target visual context information in response to determining the $t^{th}$ time of decoding is performed;

determining a first matching degree of the each candidate word according to the target visual context information and the reference visual context information;

obtaining, from the memory, a first word feature vector corresponding to the each candidate word and a second word feature vector of the $(t-1)^{th}$ decoded word;

determining a second matching degree of the each candidate word according to the first word feature vector and the second word feature vector; and determining the second selection probability of the each candidate word according to the first matching degree and the second matching degree.

4. The method according to claim 3, wherein generating the target visual context information comprises:

obtaining, according to the target visual feature and the $(t-1)^{th}$ hidden state, two-dimensional visual context information and three-dimensional visual context information in response to determining the $t^{th}$ time of decoding is performed; and fusing the two-dimensional visual context information and the three-dimensional visual context information, to obtain the target visual context information in response to determining the $t^{th}$ time of decoding is performed.

5. The method according to claim 2, wherein the memory further stores auxiliary information corresponding to the each candidate word; and determining the second selection probability of the each candidate word comprises:

determining the second selection probability of the each candidate word according to the auxiliary information, the $(t-1)^{th}$ decoded word, the $(t-1)^{th}$ hidden state, the target visual feature, and the reference visual context information corresponding to the each candidate word.

6. The method according to claim 1, wherein the at least one related video includes I related videos, and the method comprises:

determining, for the each candidate word, the I related videos corresponding to the each candidate word according to at least one sample video caption corresponding to at least one sample video, the at least one sample video caption comprising the each candidate word, and I being an integer greater than or equal to 1;

for each related video of the I related videos, determining k key visual features in the related video, a matching degree between the key visual feature and the each candidate word being higher than a matching degree between a non-key visual feature in the related video and the each candidate word, and k being an integer greater than or equal to 1;

generating the reference visual context information corresponding to the each candidate word according to the key visual features corresponding to the I related videos; and storing the reference visual context information corresponding to the each candidate word to the memory of the decoder.

7. The method according to claim 6, wherein determining the k key visual features in the related video comprises:

obtaining a feature weight of each visual feature in the related video for the each candidate word by using the basic decoder, a sum of the feature weights of all visual features in the related video being 1; and determining the visual features corresponding to the first k feature weights as the key visual features.

8. The method according to claim 1, wherein determining the decoded word in the each candidate word comprises:

calculating a target selection probability of the each candidate word according to the first selection probability and a first weight corresponding to the first selection probability and the second selection probability and a second weight corresponding to the second selection probability; and determining the each candidate word corresponding to a highest target selection probability as the decoded word.

9. The method according to claim 1, wherein encoding the target video to obtain the target visual feature of the target video comprises:

encoding the target video by using the encoder, to obtain two-dimensional visual features and three-dimensional visual features of the target video, the two-dimensional visual features being used for indicating features of a single-frame image, and the three-dimensional visual feature being used for indicating timing features of consecutive image frames; and converting the two-dimensional visual features and the three-dimensional visual features to the same feature dimension, to obtain the target visual feature.

10. A video caption generating apparatus, disposed in a computer device, the apparatus comprising: a memory storing computer program instructions; and a processor coupled to the memory and configured to execute the computer program instructions and perform:

encoding a target video by using an encoder of a video caption generating model, to obtain a target visual feature of the target video;

decoding the target visual feature by using a basic decoder of the video caption generating model, to obtain a first selection probability corresponding to each candidate word of a plurality of candidate words;

decoding the target visual feature of the target video by using an auxiliary decoder of the video caption generating model, to obtain a second selection probability corresponding to the each candidate word, wherein a memory of the auxiliary decoder stores reference visual context information corresponding to the each candidate word, and the reference visual context information has been generated according to at least one related video corresponding to the each candidate word;

determining a decoded word from the plurality of candidate words according to the first selection probability and the second selection probability of the each candidate word; and generating a video caption corresponding to the target video according to the decoded word.

11. The apparatus according to claim 10, wherein the processor is further configured to execute the computer program instructions and perform:

obtain a $(t-1)^{th}$ decoded word and a $(t-1)^{th}$ hidden state that are obtained in a $(t-1)^{th}$ time of decoding in response to determining a $t^{th}$ time of decoding is performed, the $(t-1)^{th}$ hidden state being a hidden state outputted by the basic decoder in response to determining the $(t-1)^{th}$ time of decoding is performed, and t being an integer greater than or equal to 2; and determining, by using the auxiliary decoder, the second selection probability of the each candidate word according to the $(t-1)^{th}$ decoded word, the $(t-1)^{th}$ hidden state, the target visual feature, and the reference visual context information corresponding to the each candidate word.

12. The apparatus according to claim 11, wherein the processor is further configured to execute the computer program instructions and perform:

generating, according to the target visual feature and the $(t-1)^{th}$ hidden state, target visual context information in response to determining the $t^{th}$ time of decoding is performed;

determining a first matching degree of the each candidate word according to the target visual context information and the reference visual context information;

obtaining, from the memory, a first word feature vector corresponding to the each candidate word and a second word feature vector of the $(t-1)^{th}$ decoded word;

determining a second matching degree of the each candidate word according to the first word feature vector and the second word feature vector; and determining the second selection probability of the each candidate word according to the first matching degree and the second matching degree.

13. The apparatus according to claim 12, wherein the processor is further configured to execute the computer program instructions and perform:

obtaining, according to the target visual feature and the $(t-1)^{th}$ hidden state, two-dimensional visual context information and three-dimensional visual context information in response to determining the $t^{th}$ time of decoding is performed; and fusing the two-dimensional visual context information and the three-dimensional visual context information, to obtain the target visual context information in response to determining the $t^{th}$ time of decoding is performed.

14. The apparatus according to claim 11, wherein the memory further stores auxiliary information corresponding to the each candidate word; and the processor is further configured to execute the computer program instructions and perform:

determining the second selection probability of the each candidate word according to the auxiliary information, the $(t-1)^{th}$ decoded word, the $(t-1)^{th}$ hidden state, the target visual feature, and the reference visual context information corresponding to the each candidate word.

15. The apparatus according to claim 10, wherein the at least one related video includes I related videos, and the processor is further configured to execute the computer program instructions and perform:

determining, for the each candidate word, the I related videos corresponding to the each candidate word according to at least one sample video caption corresponding to at least one sample video, the at least one sample video caption comprising the each candidate word, and I being an integer greater than or equal to 1;

for each related video of the I related videos, determining k key visual features in the related video, a matching degree between the key visual feature and the each candidate word being higher than a matching degree between a non-key visual feature in the related video and the each candidate word, and k being an integer greater than or equal to 1;

generating the reference visual context information corresponding to the each candidate word according to the key visual features corresponding to the I related videos; and storing the reference visual context information corresponding to the each candidate word to the memory of the decoder.

16. The apparatus according to claim 15, wherein the processor is further configured to execute the computer program instructions and perform:

obtaining a feature weight of each visual feature in the related video for the each candidate word by using the basic decoder, a sum of the feature weights of all visual features in the related video being 1; and determining the visual features corresponding to the first k feature weights as the key visual features.

17. The apparatus according to claim 10, wherein the processor is further configured to execute the computer program instructions and perform:

calculating a target selection probability of the each candidate word according to the first selection probability and a first weight corresponding to the first selection probability and the second selection probability and a second weight corresponding to the second selection probability; and determining the each candidate word corresponding to a highest target selection probability as the decoded word.

18. The apparatus according to claim 10, wherein the processor is further configured to execute the computer program instructions and perform:

encoding the target video by using the encoder, to obtain two-dimensional visual features and three-dimensional visual features of the target video, the two-dimensional visual features being used for indicating features of a single-frame image, and the three-dimensional visual feature being used for indicating timing features of consecutive image frames; and converting the two-dimensional visual features and the three-dimensional visual features to the same feature dimension, to obtain the target visual feature.

19. A non-transitory computer-readable storage media, storing at least one computer-readable instruction, at least one program, a code set, or a computer-readable instruction set, the at least one computer-readable instruction, the at least one program, the code set, or the computer-readable instruction set being loaded and executed by one or more processors to perform:

encoding a target video by using an encoder of a video caption generating model, to obtain a target visual feature of the target video;

decoding the target visual feature by using a basic decoder of the video caption generating model, to obtain a first selection probability corresponding to each candidate word of a plurality of candidate words;

decoding the target visual feature of the target video by using an auxiliary decoder of the video caption generating model, to obtain a second selection probability corresponding to the each candidate word, wherein a memory of the auxiliary decoder stores reference visual context information corresponding to the each candidate word, and the reference visual context information has been generated according to at least one related video corresponding to the each candidate word;

determining a decoded word from the plurality of candidate words according to the first selection probability and the second selection probability of the each candidate word; and generating a video caption corresponding to the target video according to the decoded word.

20. The non-transitory computer-readable storage media according to claim 19, wherein the at least one computer-readable instruction, the at least one program, the code set, or the computer-readable instruction set are loaded and executed by the one or more processors to further perform:

obtaining a $(t-1)^{th}$ decoded word and a $(t-1)^{th}$ hidden state that are obtained in a $(t-1)^{th}$ time of decoding in response to determining a $t^{th}$ time of decoding is performed, the $(t-1)^{th}$ hidden state being a hidden state outputted by the basic decoder in response to determining the $(t-1)^{th}$ time of decoding is performed, and t being an integer greater than or equal to 2; and determining, by using the auxiliary decoder, the second selection probability of the each candidate word according to the $(t-1)^{th}$ decoded word, the $(t-1)^{th}$ hidden state, the target visual feature, and the reference visual context information corresponding to the each candidate word.

* * * * *